(12) United States Patent
Jinno

(10) Patent No.: US 11,328,679 B2
(45) Date of Patent: May 10, 2022

(54) IMAGE PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Takayuki Jinno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 16/548,039

(22) Filed: Aug. 22, 2019

(65) Prior Publication Data

US 2019/0378468 A1    Dec. 12, 2019

Related U.S. Application Data

(63) Continuation of application No. PCT/JP2018/002127, filed on Jan. 24, 2018.

(30) Foreign Application Priority Data

Mar. 2, 2017    (JP) .............................. JP2017-039772

(51) Int. Cl.
| | |
|---|---|
| *G06T 11/00* | (2006.01) |
| *G06T 5/00* | (2006.01) |
| *G06T 7/90* | (2017.01) |
| *G09G 3/34* | (2006.01) |
| *G09G 5/10* | (2006.01) |

(Continued)

(52) U.S. Cl.
CPC ............. *G09G 3/3413* (2013.01); *G06T 7/90* (2017.01); *G06T 11/001* (2013.01); *G06T 2207/10024* (2013.01); *G09G 2360/144* (2013.01)

(58) Field of Classification Search
CPC combination set(s) only.
See application file for complete search history.

(56) References Cited

U.S. PATENT DOCUMENTS 10,284,796 B2 *   5/2019   Ise ......................... H04N 5/243
2002/0080261 A1    6/2002   Kitamura et al.
(Continued)

FOREIGN PATENT DOCUMENTS

| JP | 2001-203933 A | 7/2001 |
|---|---|---|
| JP | 2002-077591 A | 3/2002 |

(Continued)

OTHER PUBLICATIONS

Apr. 17, 2018 International Search Report in International Patent Appln. No. PCT/JP2018/002127.

*Primary Examiner* — Wesner Sajous
(74) *Attorney, Agent, or Firm* — Venable LLP

(57) ABSTRACT

This invention corrects, with consideration to the luminance of a display device, an image artifact related to the luminance or a color that originates from a high-luminance region set as the display target. To achieve this, the invention comprises an obtainment unit which obtains information corresponding to a luminance range which can be displayed by the display device, a derivation unit which derives a correction amount for correcting an artifact of display-target image data based on a maximum luminance value indicated by the obtained information, and a correction unit which corrects the image data based on the derived correction amount and generates display image data.

20 Claims, 23 Drawing Sheets

(51) Int. Cl.
G09G 5/36 (2006.01)
H04N 1/40 (2006.01)
H04N 5/57 (2006.01)

(56) References Cited

U.S. PATENT DOCUMENTS

| | | | | |
|---|---|---|---|---|
| 2006/0007219 | A1* | 1/2006 | Sakashita | H04N 9/3105 |
| | | | | 345/204 |
| 2006/0033749 | A1* | 2/2006 | Yamada | H04N 9/69 |
| | | | | 345/595 |
| 2008/0317339 | A1* | 12/2008 | Steinberg | G06T 5/50 |
| | | | | 382/167 |
| 2010/0231603 | A1* | 9/2010 | Kang | G09G 3/3426 |
| | | | | 345/591 |
| 2018/0204528 | A1 | 7/2018 | Miyazawa et al. | |

FOREIGN PATENT DOCUMENTS

| | | |
|---|---|---|
| JP | 2005-295513 A | 10/2005 |
| JP | 2006-254238 A | 9/2006 |
| JP | 4746892 B2 | 8/2011 |
| JP | 2012-085083 A | 4/2012 |
| JP | 2012-134630 A | 7/2012 |
| WO | 2017/022513 A1 | 2/2017 |

* cited by examiner

FIG. 4A

| 89 | 83 | 127 | 95 | 57 | 83 | 40 | 40 |
|---|---|---|---|---|---|---|---|
| 21 | 146 | 132 | 141 | 117 | 141 | 50 | 64 |
| 0 | 146 | 160 | 132 | 173 | 151 | 50 | 89 |
| 9 | 50 | 185 | 185 | 57 | 83 | 64 | 141 |
| 57 | 50 | 248 | 212 | 0 | 40 | 70 | 112 |
| 155 | 146 | 212 | 177 | 89 | 31 | 77 | 40 |
| 164 | 255 | 160 | 155 | 122 | 9 | 127 | 71 |
| 189 | 212 | 177 | 117 | 141 | 89 | 137 | 64 |

FIG. 4B

| 119 | 134 | 118 | 89 |
|---|---|---|---|
| 77 | 171 | 115 | 103 |
| 130 | 199 | 51 | 89 |
| 212 | 170 | 114 | 114 |

| DISPLAY LUMINANCE [nits] | CORRECTION AMOUNT [%] |
|---|---|
| 0 | 0.0 |
| 50 | 0.0 |
| 100 | 0.0 |
| 200 | 6.4 |
| 300 | 9.6 |
| 400 | 12.3 |
| 500 | 14.6 |
| ... | ... |
| 1000 | 23.7 |
| 2000 | 37.1 |
| ... | ... |
| 8000 | 87.3 |
| 9000 | 93.8 |
| 10000 | 100.0 |

FIG. 8A

| DISPLAY LUMINANCE [nits] | CORRECTION AMOUNT FOR EACH ENVIRONMENTAL LIGHT [%] | | | | | |
|---|---|---|---|---|---|---|
| | 50 [lx] | 500 [lx] | 1000 [lx] | 2000 [lx] | 10000 [lx] | 100000 [lx] |
| 0 | 0.0 | 0.0 | 0.0 | 0.0 | 0.0 | 0.0 |
| 50 | 0.0 | 0.0 | 0.0 | 0.0 | 0.0 | 0.0 |
| 100 | 0.0 | 0.0 | 0.0 | 0.0 | 0.0 | 0.0 |
| 200 | 6.4 | 5.7 | 5.1 | 3.8 | 2.5 | 0.0 |
| 300 | 9.6 | 8.7 | 7.7 | 5.8 | 3.9 | 0.0 |
| 400 | 12.3 | 11.0 | 9.8 | 7.4 | 4.9 | 0.0 |
| 500 | 14.6 | 13.1 | 11.7 | 8.8 | 5.8 | 0.0 |
| ... | ... | ... | ... | ... | ... | ... |
| 1000 | 23.7 | 21.4 | 19.0 | 14.2 | 9.5 | 0.0 |
| 2000 | 37.1 | 33.4 | 29.7 | 22.3 | 14.9 | 0.0 |
| ... | ... | ... | ... | ... | ... | ... |
| 8000 | 87.3 | 87.6 | 70.0 | 52.4 | 34.9 | 0.0 |
| 9000 | 93.8 | 84.4 | 75.1 | 56.3 | 37.5 | 0.0 |
| 10000 | 100.0 | 90.0 | 80.0 | 60.0 | 40.0 | 0.0 |

FIG. 8B

| DISPLAY LUMINANCE [nits] | CORRECTION AMOUNT FOR EACH ENVIRONMENTAL LIGHT [%] | | | | | | |
|---|---|---|---|---|---|---|---|
| | 50 [lx] | 500 [lx] | 1000 [lx] | 2000 [lx] | 10000 [lx] | 100000 [lx] |
| 0 | 0.0 | 0.0 | 0.0 | 0.0 | 0.0 | 0.0 |
| 50 | 0.0 | 0.0 | 0.0 | 0.0 | 0.0 | 0.0 |
| 100 | 0.0 | 0.0 | 0.0 | 0.0 | 0.0 | 0.0 |
| 200 | 0.0 | 2.5 | 3.8 | 5.1 | 5.7 | 6.4 |
| 300 | 0.0 | 3.9 | 5.8 | 7.7 | 8.7 | 9.6 |
| 400 | 0.0 | 4.9 | 7.4 | 9.8 | 11.0 | 12.3 |
| 500 | 0.0 | 5.8 | 8.8 | 11.7 | 13.1 | 14.6 |
| ... | ... | ... | ... | ... | ... | ... |
| 1000 | 0.0 | 9.5 | 14.2 | 19.0 | 21.4 | 23.7 |
| 2000 | 0.0 | 14.9 | 22.3 | 29.7 | 33.4 | 37.1 |
| ... | ... | ... | ... | ... | ... | ... |
| 8000 | 0.0 | 34.9 | 52.4 | 70.0 | 87.6 | 87.3 |
| 9000 | 0.0 | 37.5 | 56.3 | 75.1 | 84.4 | 93.8 |
| 10000 | 0.0 | 40.0 | 60.0 | 80.0 | 90.0 | 100.0 |

F I G. 11

| 0.026 | 0.029 | 0.031 | 0.029 | 0.026 |
|-------|-------|-------|-------|-------|
| 0.029 | 0.038 | 0.051 | 0.038 | 0.029 |
| 0.031 | 0.051 | 0.186 | 0.051 | 0.031 |
| 0.029 | 0.038 | 0.051 | 0.038 | 0.029 |
| 0.026 | 0.029 | 0.031 | 0.029 | 0.026 |

FIG. 13A

| 0 | -0.167 | 0 |
|---|---|---|
| -0.167 | 1.667 | -0.167 |
| 0 | -0.167 | 0 |

FIG. 13B

| 0 | -1 | 0 |
|---|---|---|
| -1 | 5 | -1 |
| 0 | -1 | 0 |

| DISPLAY LUMINANCE [nits] | CORRECTION AMOUNT [%] |
|---|---|
| 0 | 100.0 |
| 50 | 100.0 |
| 100 | 97.0 |
| 200 | 88.3 |
| 300 | 75.0 |
| 400 | 58.7 |
| 500 | 41.3 |
| ... | ... |
| 1000 | 35.8 |
| 2000 | 22.5 |
| ... | ... |
| 8000 | 3.5 |
| 9000 | 1.7 |
| 10000 | 0.0 |

F I G. 16D
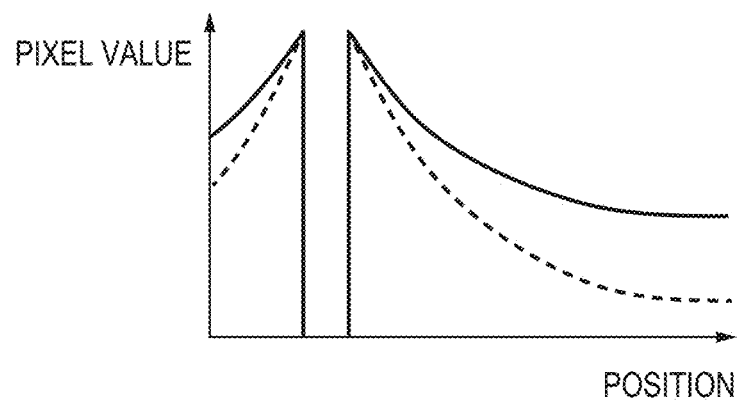
F I G. 16E
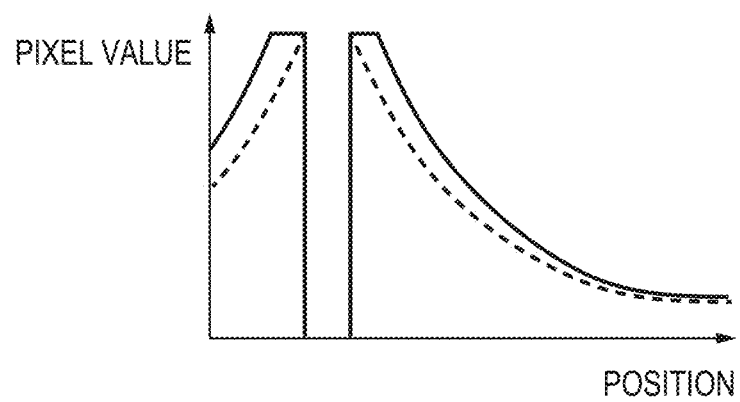

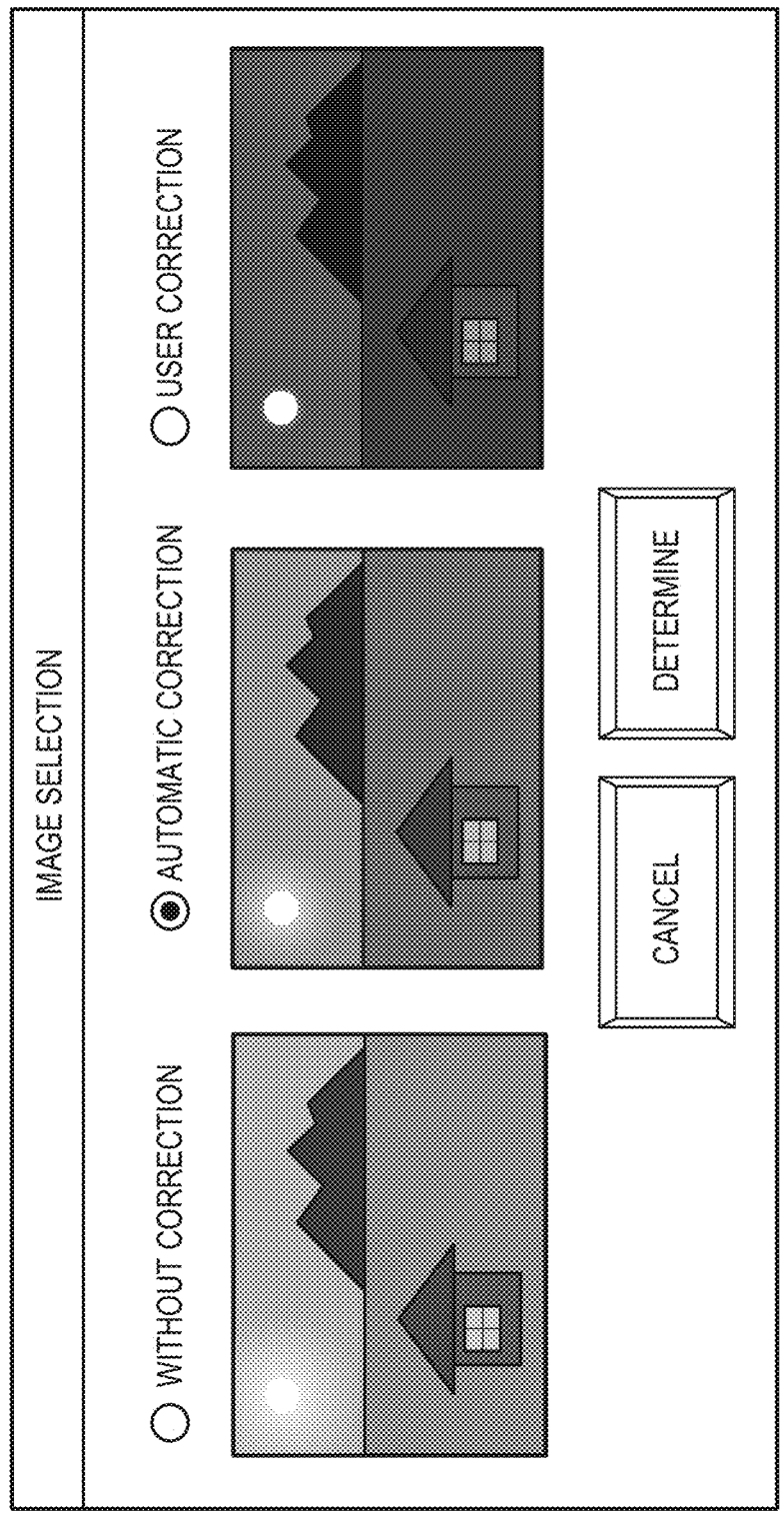

IMAGE PROCESSING APPARATUS, CONTROL METHOD THEREOF, AND NON-TRANSITORY COMPUTER-READABLE STORAGE MEDIUM

CROSS-REFERENCE TO RELATED APPLICATIONS

This application is a Continuation of International Patent Application No. PCT/JP2018/002127, filed Jan. 24, 2018, which claims the benefit of Japanese Patent Application No. 2017-039772, filed Mar. 2, 2017, both of which are hereby incorporated by reference herein in their entirety.

BACKGROUND OF THE INVENTION

Field of the Invention

The present invention relates to an image processing apparatus, a control method thereof, and a non-transitory computer-readable storage medium.

Background Art

In an image capturing apparatus such as a digital camera, there is a high-dynamic range (HDR) image capturing technique for obtaining an image that has a wider than ever luminance range (dynamic range) of an object by combining a plurality of images captured under different exposure conditions or by using an image sensor with an expanded capturable luminance range. By including a high-luminance object such as the headlights of a car, the sun, or the reflection light on a very glossy object such as a metal as an image capturing target in accordance with the expansion of the dynamic range of an image capturing apparatus, the breadth of expression of a photo or a video can be expanded.

On the other hand, in a case in which a high-luminance object such as the sun or the like is captured or in a case in which the lens is hit by an intense light beam, an artifact related to luminance or a color can originate from the high-luminance object. For example, there is a phenomenon called a "flare" in which a captured image becomes bright or the color of the high-luminance object due to diffraction of an objective lens or due to multiple reflections generated between a combination of lenses, a lens and an image sensor, a lens and a lens barrel, an image sensor and a cover glass of the image sensor, or the like. Also, when an intense light beam is reflected again by the inner surface of the lens, particularly, the concave surface, there is a phenomenon called "ghosting" in which an image of intense light such as a light source will appear comparatively clearly at a point symmetrical position with respect to the center of the angle of view as a reference. In addition, there is also a phenomenon called "light rays" in which rays of light that radially extend from a high-luminance object such as the sun appear due to the shape of the aperture. These differences such as a "flare", "ghosting", "light rays", and the like in the luminance or a color from the actual object originating from a high-luminance object will be called generically as "artifacts" in this specification. However, note that terms such as a "flare", "ghosting", and "light rays" will be specified when a phenomenon is to be discriminated in detail.

In addition, when a person is to observe a high-luminance object, there are not only artifacts generated by the camera, but also artifacts which are generated by the eye. For example, light diffracted by eyelashes can be observed like ghosting or light rays, and light scattered in an eyeball can be observed like a flare in the camera. This can occur not only when an actual scene is observed, but also when an image on a display is observed.

CITATION LIST

Patent Literature

PTL 1: Japanese Patent No. 4746892

As described above, when an image displayed on a display device such as a display or a projector is observed, the human eye will generate an artifact depending on the luminance. Hence, in a case in which a display capable of high-luminance display displays a captured image in which a flare has been generated because a high-luminance object has been captured, an observer may feel a sense of incongruity because he/she will simultaneously perceive both an artifact which has been generated in the camera and an artifact which has been generated in his/her eye. However, a technique for correcting an image artifact based on the luminance of a display device has not been disclosed.

PTL 1 discloses a technique related to a circuit for correcting a flare which is generated in a display device. This technique is an edge enhancement technique to address the problem of a flare in a display that generates a blur at an edge portion due to an MTF characteristic of a projection lens of a display device such as a projector. Although the factors for the flare are on the side of the display device since the surroundings of the high-luminance object become bright due to the blur generated at the edge portion, this problem is similar to the problem described above in that a flare is perceived by the observer. Particularly, since the edge enhancement effect will decrease in accordance with a reduction in the human visual sensitivity when the surroundings of the object are bright, the gain and the band of flare correction are automatically adjusted depending on the brightness of the surroundings. PTL 1 discloses a technique to correct the flare in the display apparatus in accordance with the brightness of the surroundings, but does not disclose a technique to correct an artifact such as a flare or the like based on the luminance of the displayed image itself.

The present invention has been made in consideration of the above problem and provides a technique to correct an image artifact related to related to luminance or color originating from a high-luminance region set as a display target.

SUMMARY OF THE INVENTION

To solve this problem, for example, an image processing apparatus of the present invention includes the following arrangement. That is, there is provided an image processing apparatus that corrects image data to be displayed on a display device, the apparatus comprising: an obtainment unit configured to obtain information corresponding to a luminance range which can be displayed by the display device; a derivation unit configured to derive a correction amount for correcting an artifact of display-target image data based on a maximum luminance value indicated by the information obtained by the obtainment unit; and a correction unit configured to correct the image data based on the derived correction amount and to generate display image data.

Further features of the present invention will become apparent from the following description of exemplary embodiments (with reference to the attached drawings).

BRIEF DESCRIPTION OF THE DRAWINGS

FIG. 4A is a view showing an example of resolution conversion in a display luminance obtainment unit;

FIG. 4B is a view showing an example of resolution conversion in the display luminance obtainment unit;

FIG. 8A is a table showing an example of an LUT for calculating a correction amount based on environmental light intensity in an arrangement in which the artifact correction unit includes an environmental light obtainment unit according to the first embodiment;

FIG. 8B is a table showing an example of the LUT for calculating the correction amount based on environmental light intensity in the arrangement in which the artifact correction unit includes the environmental light obtainment unit according to the first embodiment;

FIG. 11 is a view showing a filter used to make the high luminance region blurry according to the first embodiment;

FIG. 13A is a view showing an example of a filter used in the artifact correction execution unit according to the first embodiment;

FIG. 13B is a view showing an example of the filter used in the artifact correction execution unit according to the first embodiment;

FIG. 16D is a graph for explaining the artifact detection method and the artifact addition method according to the second embodiment;

FIG. 16E is a graph for explaining the artifact detection method and the artifact addition method according to the second embodiment;

FIG. 21 is a view showing an example of a user interface for image selection according to the third embodiment;

DESCRIPTION OF THE EMBODIMENTS

Embodiments of the present invention will be described in detail hereinafter with reference to the accompanying drawings. Note that the following embodiments do not limit the scope of the appended claims, and not all combinations of features described in the embodiments are essential to the solving means of the present invention.

First Embodiment

This embodiment will describe an apparatus and a method for correcting an artifact that originates from a high-luminance region of an image and is generated as a bias component of luminance or a color. Particularly, this embodiment will increase the correction amount when the luminance displayed by a display device is high to reduce the sense of incongruity caused by an artifact when an observer is to observe an image.

Arrangement of Image Processing Apparatus

Figure 1:
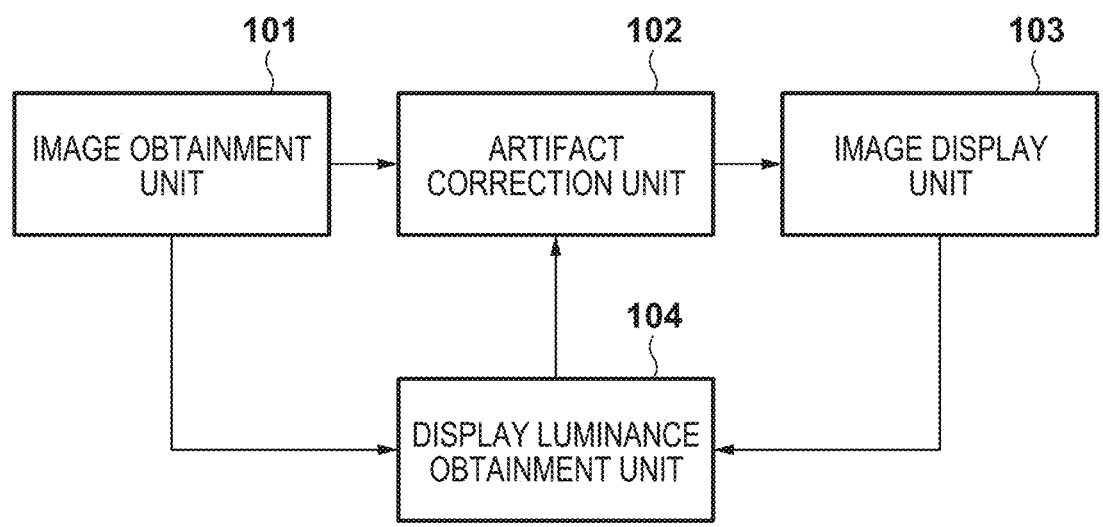
FIG. 1 is a schematic block diagram of an image processing apparatus according to the first embodiment.

FIG. 1 is a schematic block diagram showing the schematic arrangement of an image processing apparatus according to the embodiment. This apparatus includes, as shown in FIG. 1, an image obtainment unit 101, an artifact correction unit 102, an image display unit 103, and a display luminance obtainment unit 104.

The image obtainment unit 101 is an image editing application or an image display application in an information processing apparatus such as a personal computer (PC) or the like, and may be of any type as long as it has a function to obtain a display-target image. An image capturing apparatus such as a digital camera or the like is a representative generation source of the display-target image. The artifact correction unit 102 generates a display image data by deriving a correction amount from display luminance information obtained by the display luminance obtainment unit 104 (to be described later) and performing artifact correction processing on an image obtained by the image obtainment unit 101 based on the derived correction amount. The display luminance obtainment unit 104 obtains the display luminance information used in the artifact correction by the artifact correction unit 102. The image display unit 103 includes an image display device such as a display, a projector, or the like, receives the display image data which has undergone the artifact correction performed by the artifact correction unit 102, and displays the received display image data.

Figure 3:
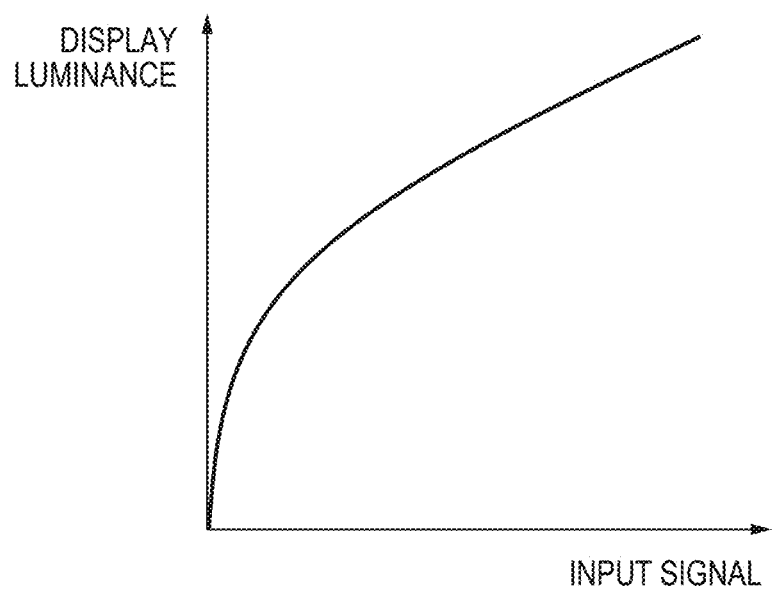
FIG. 3 is a chart showing the correspondence relationship of a pixel value and a display luminance value in an image display unit.

In this case, the display luminance information indicates, for example, the maximum luminance that can be output from the image display device of the image display unit 103. In addition, the display luminance information is the maximum display luminance corresponding to the display-target image and determined by the maximum luminance that can be output from the image display device of the image display unit 103 and the maximum pixel value of an image obtained by the image obtainment unit 101. A conversion formula or a table indicating the correspondence relationship between the pixel value and the display luminance value as shown by a graph in FIG. 3 is used to calculate this display luminance information. Assume that the correspondence relationship is stored in a memory of the image display device of the image display unit 103. Since a correspondence relationship between a pixel value and an actual display luminance value depends on the display device, a database that includes the correspondence relationship between the device type of each display device and each display luminance value may prepared in advance so that the correspondence relationship can be obtained by referring to this table when a display device to be actually used is designated. Hence, a luminance value that is slightly lower than the maximum luminance value may be used instead of the exact maximum luminance value. That is, it is sufficient to be able to obtain luminance information that indicates a luminance value that is close to the maximum luminance value and can be classified as a high luminance value in the luminance range that can be output by the image display device, and thus a range that includes a luminance value close to this maximum luminance range may be obtained. Assume that this output luminance information is included in the maximum luminance value hereinafter.

In a case in which the spatial frequency characteristic of a pixel indicating a high luminance value on an image is distributed at a high frequency, it is difficult for the observer of the image to sense the artifact. Hence, it is preferable to use the maximum pixel value of a low-frequency component of an image of the image obtainment unit 101 instead of simply employing the maximum pixel value of the image obtained by the image obtainment unit 101. That is, the display luminance information is set based on the maximum display luminance value that corresponds to the display-target image and is determined based on the maximum luminance value which can be output from the image display device of the image display unit 103 and the maximum pixel value of a low-frequency component of the image obtained by the image obtainment unit 101. Therefore, although it is not shown in the drawings, it is preferable for the display luminance obtainment unit 104 to include a conversion unit that converts the image obtained by the image obtainment unit 101 into a low-frequency image. Either filter processing or resolution conversion may be performed in this conversion unit. The display luminance obtainment unit 104 obtains the maximum pixel value (maximum luminance value) of the low-frequency component.

Resolution conversion performed in the conversion unit of the display luminance obtainment unit 104 will be described with reference to FIGS. 4A and 4B. FIG. 4A shows a part of an image obtained by the image obtainment unit 101, and the value of each pixel indicates a pixel value. A value highly correlated with the brightness of the image such as a Y value or the like of an image converted from an RGB image to a YUV image is used as the pixel value. FIG. 4B shows pixel values of an image obtained by performing resolution conversion processing by using a bicubic interpolation method which is a known resolution conversion method on the part of the image shown in FIG. 4A. Note that the resolution conversion method is not limited to this, and other known methods such as a bilinear interpolation method, a Lanczos interpolation method, an average pixel method, or the like can be used. A pixel value is obtained from the pixel surrounded by a thick border in FIG. 4A when the display luminance information is to be obtained from the image obtained by the image obtainment unit 101, and a pixel value is obtained from the pixel surrounded by a thick border in FIG. 4B when the display luminance information is to be obtained from the low-frequency component of the image obtained by the image obtainment unit 101. The display luminance information is obtained from these pixel values and the correspondence relationship shown in FIG. 3. In addition, in a case in which an image format that has a display luminance value is to be used as additional information, the display luminance value obtained from the image obtainment unit 101 can be used as the display luminance information. Note that the display luminance information need not always be limited to the luminance, and a different piece of information such as lightness in compliance with a CIE standard may be used as long as it is information related to lightness.

Figure 2:
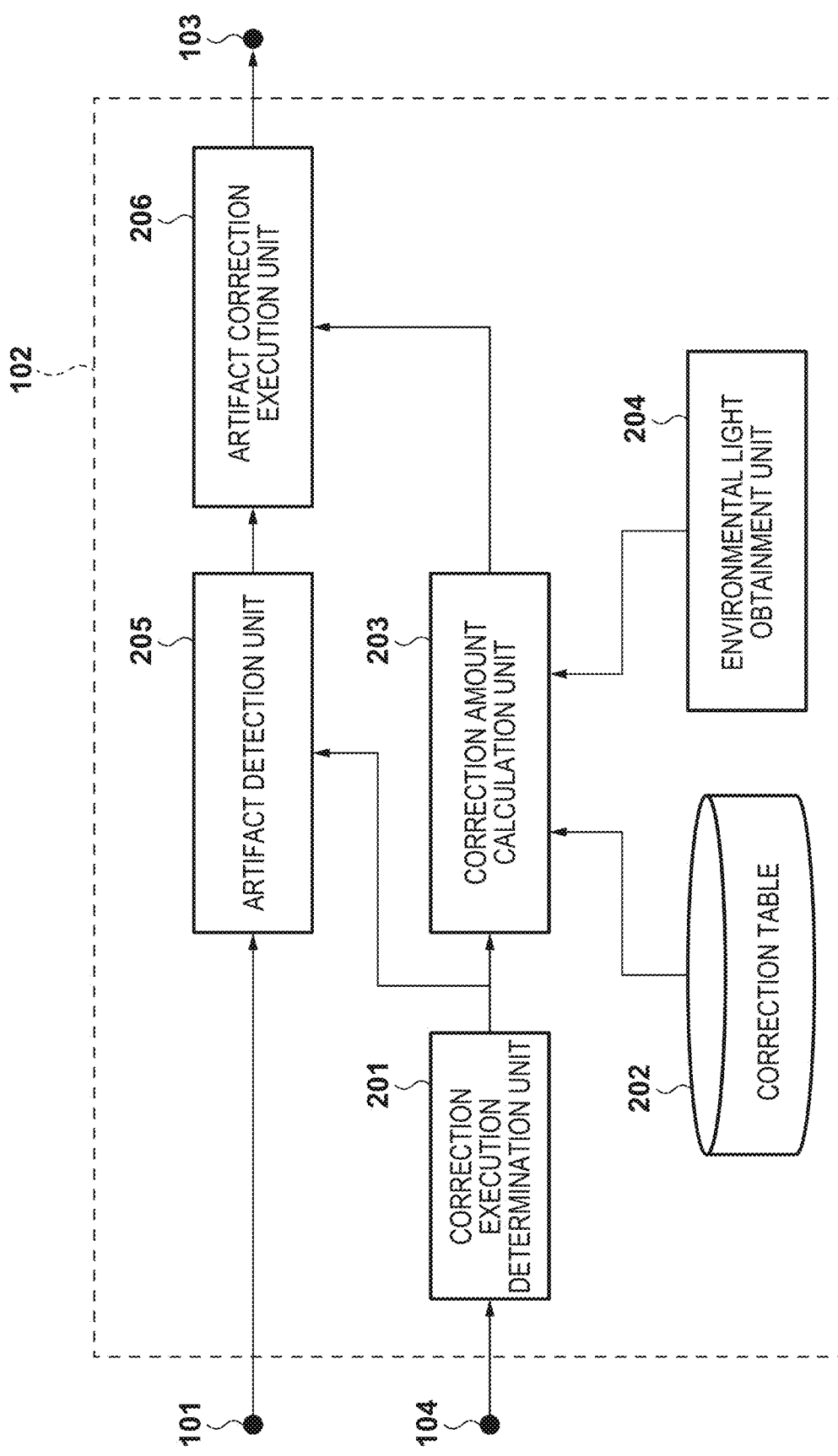
FIG. 2 is a block diagram showing the arrangement of an artifact correction unit according to the first embodiment.

FIG. 2 is a block diagram of the artifact correction unit 102 according to the embodiment. A correction execution determination unit 201 determines whether to execute artifact correction based on the display luminance information obtained by the display luminance obtainment unit 104. More specifically, the correction execution determination unit 201 compares the luminance value indicated by the display luminance information with a preset threshold. If the luminance value is equal to or more than the threshold, a determination will be made to execute the correction. If the luminance value is less than the threshold, a determination will be made not to execute the correction. Note that it is preferable for this threshold to be arranged so that a user can change its settings via an operation unit, and to be stored in a nonvolatile memory to simplify its storage unless a change instruction is made.

In a case in which the correction execution determination unit 201 determines that the correction is not to be executed, the image data obtained by the image obtainment unit 101 is output to and displayed by the image display unit 103 without performing any processing in the subsequent processing blocks. On the other hand, if the correction execution determination unit 201 determines that the correction is to be executed, a correction amount calculation unit 203 will calculate, upon receiving this determination result, the correction amount required to correct the artifact. Although the correction amount calculation method will be described later, the correction amount is obtained by referring to a correction table 202 based on the display luminance information obtained by the display luminance obtainment unit 104. In the correction calculation by the correction amount calculation unit 203, it is possible to calculate the correction amount by using not only the display luminance information, but also by additionally using the information of an environmental light intensity obtained by an environmental light obtainment unit 204. This environmental light intensity may be obtained by an illuminance sensor mounted in the display device such as a display or may be a value obtained by measuring the surroundings of the display device by using another illuminometer. Alternatively, the user may set this value via the operation unit (not shown).

If the execution of the correction is determined by the correction execution determination unit 201, an artifact detection unit 205 will detect (to be described in detail later) each artifact in the image obtained by the image obtainment unit 101. An artifact correction execution unit 206 will execute artifact correction based on the correction amount calculated by the correction amount calculation unit 203 and the artifact detection result detected by the artifact detection unit 205. Note that the artifact detection unit 205 is not always a required component depending on the contents of the correction processing of the artifact correction execution unit 206.

Image Processing Procedure

Figure 5:
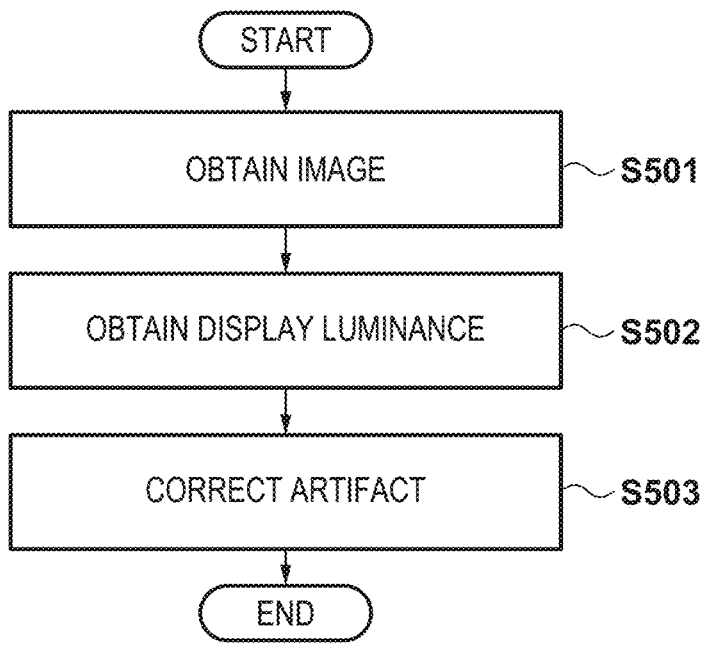
FIG. 5 is a flowchart showing a processing procedure of the image processing apparatus according to the first embodiment.

FIG. 5 is a flowchart showing the procedure of the overall processing of the image processing apparatus according to this embodiment. First, the image obtainment unit 101 obtains an image to be the display target of the image display device of the image display unit 103 (step S501). Next, the display luminance obtainment unit 104 obtains the display luminance information of the image when the image is to be displayed by the image display device of the image display unit 103 (step S502). Finally, based on the display luminance information obtained in step S502, the artifact correction unit 102 corrects the artifact related to the luminance or a color originating from the high-luminance region of the image obtained in step S501.

Figure 6:
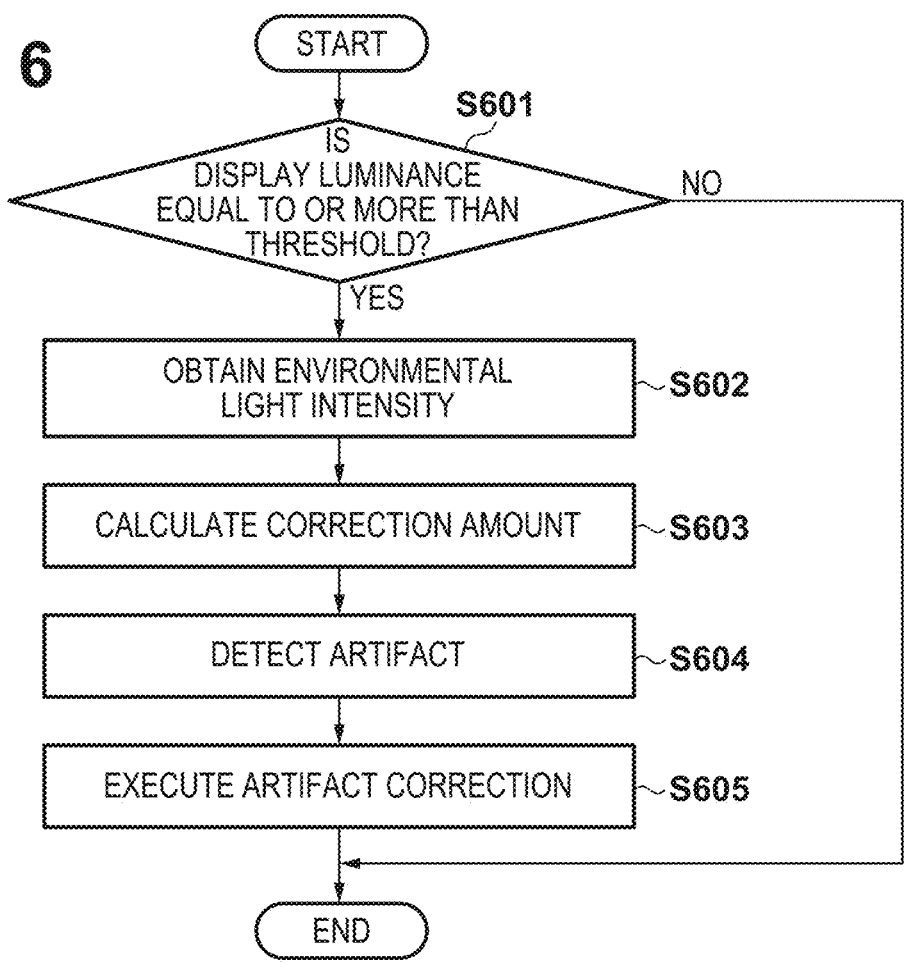
FIG. 6 is a flowchart showing a processing procedure of the artifact correction unit according to the first embodiment.

Details of the processing of step S503 of FIG. 5 will be described next with reference to the flowchart of FIG. 6. FIG. 6 is also a flowchart showing the procedure performed by the artifact correction unit 102.

First, the artifact correction unit 102 causes the correction execution determination unit 201 to compare the value of the display luminance information obtained by the display luminance obtainment unit 104 with the preset threshold (step S601). If it is determined that the value of the display luminance information is equal to or more than the threshold, the artifact correction unit 102 advances the process to step S602. If it is determined that the value of the display luminance information is less than the threshold, the artifact correction unit 102 determines not to execute the artifact correction and ends the processing. Next, the artifact correction unit 102 causes the environmental light obtainment unit 204 to obtain the environmental light intensity such as the luminance of the image display device or the luminance of the surroundings of the image display device (step S602). As described above, the environmental light intensity need not always be obtained. In an arrangement without the environmental light obtainment unit 204, this process of step S602 is not performed. Next, the artifact correction unit 102 performs control to cause the correction amount calculation unit 203 to determine the correction amount to be used in the artifact correction processing by referring to the correction table 202 based on the value of the display luminance information obtained by the display luminance obtainment unit 104 (step S603).

Next, the artifact correction unit 102 performs control to cause the artifact detection unit 205 to detect an artifact in the image obtained by the image obtainment unit 101 (step S604). Finally, the artifact correction unit 102 performs control to cause the artifact correction execution unit 206 to execute artifact correction on the image obtained by the image obtainment unit 101 based on the correction amount determined in step S603 and the artifact detected in step S604 (step S605). As described above, depending on the contents of the artifact correction processing, artifact detection need not be performed. In an arrangement without the artifact detection unit 205, the artifact correction execution unit 206 will execute, in step S605, artifact correction based on only the correction amount calculated in step S603.

Artifact Correction Amount Calculation

Figures 7A, 7B:
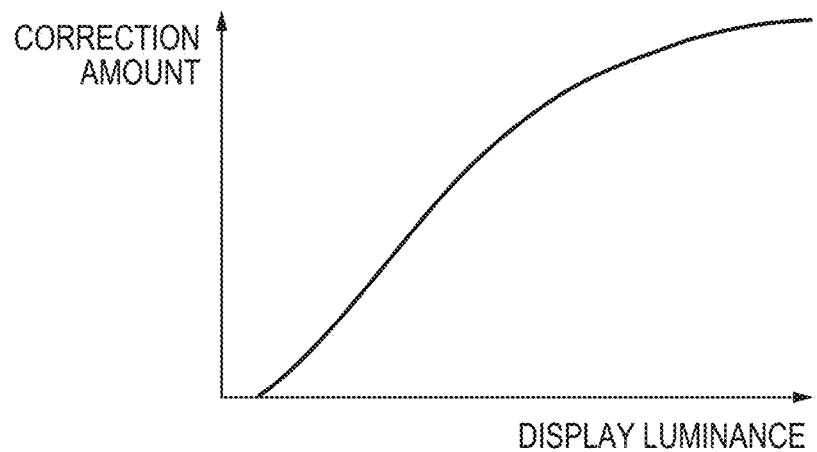
FIG. 7A is a graph showing the contents of a correction table according to an embodiment.
FIG. 7B is a table showing the contents of the correction table according to the embodiment.

FIG. 7A is a graph showing the contents of the correction table 202, and FIG. 7B shows a specific example of a lookup table (LUT). The graph of FIG. 7A shows the relationship between the correction amount and the display luminance value obtained by the display luminance obtainment unit 104. It can be understood that the correction amount increases in accordance with the increase in the value of the display luminance information. In addition, FIG. 7B is a specific LUT of the relationship between the display luminance information and each correction amount shown in FIG. 7A. The correction table 202 holds data having an LUT format as shown in FIG. 7B. In a case in which the display luminance value obtained by the display luminance obtainment unit 104 is a value between two display luminance values described in the LUT, the display luminance correction amount whose difference with the obtained luminance value is smaller in the LUT will be determined as the correction amount to be used. Note that the correction amount may be obtained by executing interpolation by a known interpolation technique such as linear interpolation. In a case in which the obtained display luminance value exceeds the display luminance value described in the LUT, the correction amount may be obtained by executing extrapolation by a known extrapolation technique such as linear extrapolation. Furthermore, although the correction amount is set to 100% when the display luminance value is 10,000 nits in the example of FIG. 7B, the present invention is not limited to this. For example, the correction amount may be set to 100% when the display luminance value is 1,000 nits. Note that other than the LUT format shown in FIG. 7B, the relationship between the display luminance value and the correction amount may be held as a "function".

Each of FIGS. 8A and 8B is a table showing an example of the correction LUT when the correction amount is to be obtained based on the environmental light intensity in an arrangement in which the artifact correction unit 102 includes the environmental light obtainment unit 204. The correction amount calculation unit 203 calculates the correction amount based on the display luminance value obtained by the display luminance obtainment unit 104 and the environmental light intensity obtained by the environmental light obtainment unit 204.

When an image is observed in an environment with dark surroundings, an observer can particularly recognize very fine differences in the brightness of a dark region of the image because of human visual characteristics. That is, the correction amount will increase in a dark environment where artifacts such as a flare and the like are more obvious to the human eye, in other words, when the value of the environmental light intensity is small. FIG. 8A shows an example of a correction LUT in which the correction amount is increased in accordance with the reduction in the value of the environmental light intensity.

On the other hand, when an image is observed in an environment with bright surroundings, it is difficult for the observer to recognize very fine differences in brightness because of human visual characteristics. On the assumption that the same image will be observed in a plurality of environments, and to allow the observer to have a similar impression of the appearance of the image under different environments, the correction amount will be increased the brighter the environment is, in other words, the larger the value of the environmental light intensity is. FIG. 8B shows an example of a correction LUT in which the correction amount is increased in accordance with the increase in the value of the environmental light intensity.

Artifact Correction Processing

Figure 9A:
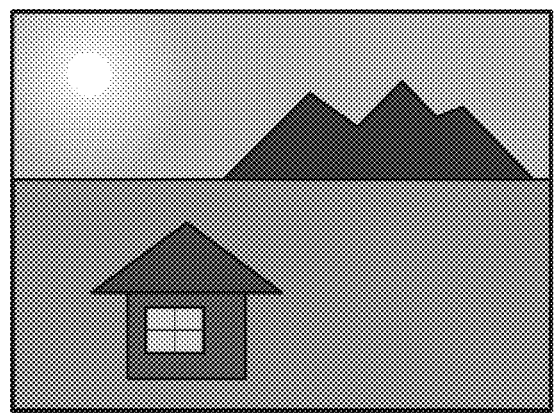
FIG. 9A is a view for explaining processing to extract a high-luminance region of an image performed by an artifact detection unit according to the first embodiment.
Figure 9B:
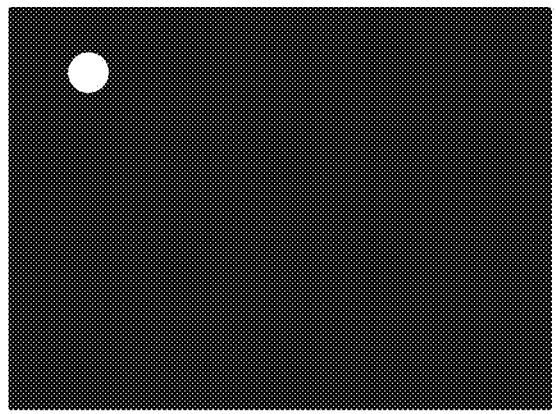
FIG. 9B is a view for explaining the processing to extract the high-luminance region of the image performed by the artifact detection unit according to the first embodiment.

A method for extracting a high-luminance region of an image to detect an artifact by the artifact detection unit 205 will be described with reference to FIGS. 9A and 9B. FIG. 9A shows an example of an image obtained by the image obtainment unit 101. FIG. 9B shows a binary image obtained by performing binarization processing on the image of FIG. 9A based on the predetermined threshold that has been set in advance. The white region in this binary image indicates a high-luminance region, and the black region in this binary image indicates a non-high-luminance region. The pixel value of a non-high-luminance region in a binary image here is assumed to be zero. Assume also that the high-luminance region of the binary image represents the average luminance value of the region in an actual image. This binary image represents the determination result of the correction execution determination unit 201.

Note that in a case in which the spatial frequency characteristics of a pixel indicating a high pixel value on the image are distributed at a high frequency, it is preferable to extract a component with a frequency lower than the predetermined frequency as an artifact generation source candidate since the degree to which the an artifact such as a flare will be generated at the time of image capturing is small. Filter processing or a method similar to resolution conversion described with reference to FIGS. 4A and 4B can be used as the low-frequency component extraction method. The artifact detection unit 205 calculates, from the actual image shown in FIG. 9A corresponding to the region shown in white in FIG. 9B, an average value of each of R, G, and B values and converts the average values of respective R, G, and B values into Y, U, V values of the YUV color system. In addition, the artifact detection unit obtains the barycentric coordinates of the region. That is, pieces of information related to brightness such as luminance, information related to color tone, and information related to the position on the image are obtained. Although a plurality of high-luminance regions may be extracted, it is preferable to preset an upper limit of the number of regions to be extracted and determine each region to be extracted based on the magnitude of the average pixel value and area.

Figure 10A:
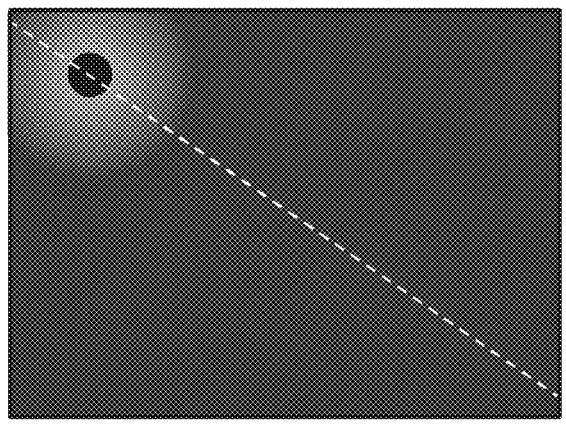
FIG. 10A is a view for explaining artifact detection processing performed by the artifact detection unit.

An artifact detection method performed by the artifact detection unit 205 will be described with reference to FIGS. 10A to 10D. FIG. 10A shows an artifact component image detected from the image shown in FIG. 9A. The brighter the color is in this artifact component image, the larger the artifact is. That is, the artifact component image has a characteristic in which the luminance value gradually decreases from the high-luminance region towards its surroundings.

Figure 10B:
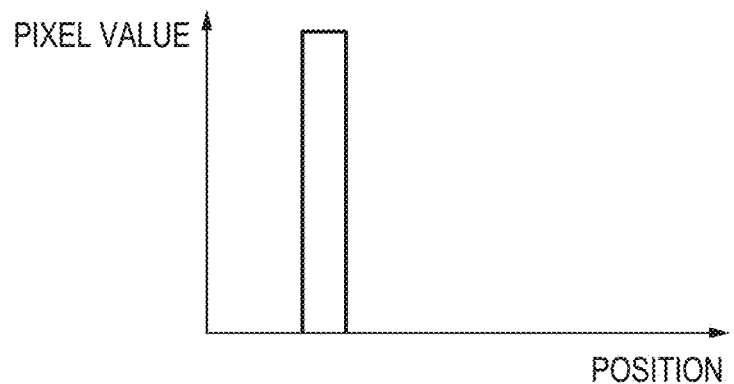
FIG. 10B is a graph for explaining the artifact detection processing performed by the artifact detection unit.
Figure 10C:
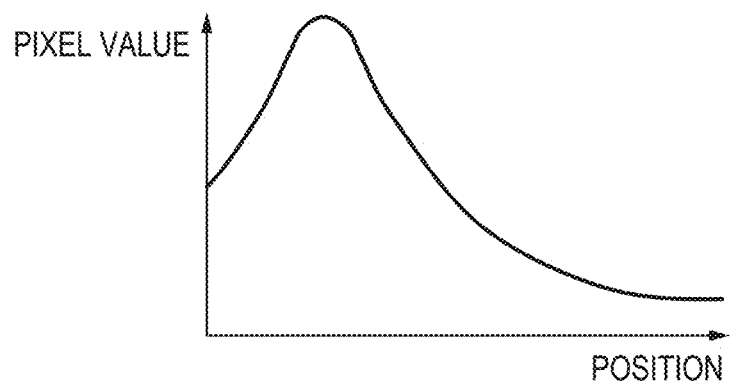
FIG. 10C is a graph for explaining the artifact detection processing performed by the artifact detection unit.
Figure 10D:
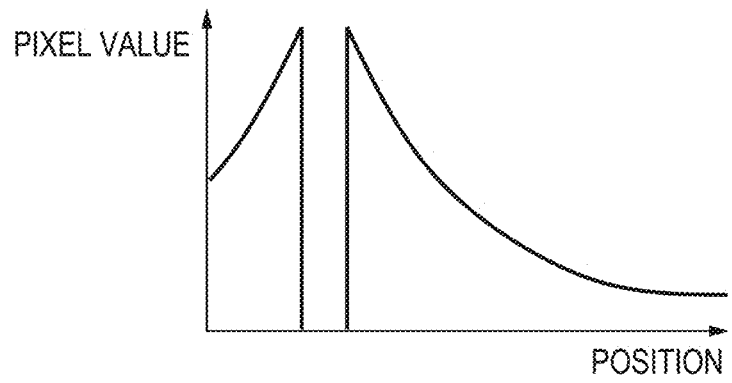
FIG. 10D is a graph for explaining the artifact detection processing performed by the artifact detection unit.

A method of detecting an artifact component image as that shown in FIG. 10A will be described with reference to FIGS. 10B, 10C, and 10D. FIG. 10B shows a distribution of pixels cutting across the binary image (a binary image in which the high-luminance region is indicated by an average luminance value and the non-high-luminance region is indicated by zero) of FIG. 9B in the manner of broken lines illustrated in FIG. 10A. The abscissa indicates a position on the line, and a luminance value is indicated in the ordinate direction. FIG. 10C is a graph showing the relationship between a pixel value and a position of an image obtained by blurring the image of FIG. 9B by a predetermined filter, and indicates a pixel value on a line indicated by dotted lines of FIG. 10A. Note that although a Gaussian filter as shown in FIG. 11 can be used as the filter for blurring the image in which the high-luminance region has been extracted, another filter such as a media filter may be used as long as it is a filter for blurring. Although a 5×5 filter is exemplified in FIG. 11, the filter size or coefficients are not limited to this example. The artifact detection unit 205 stores a plurality of filters and applies a suitably sized filter in accordance with the image. FIG. 10D is a graph showing the relationship of the pixel value with a position on the image obtained by subtracting the image of FIG. 9B from the image blurred by the predetermined filter, and this graph indicates the pixel value on the line indicated by dotted lines of FIG. 10A. That is, the pixel value profile of FIG. 10A corresponds to the profile of the dotted lines of the artifact component shown in FIG. 10A. Note that in a case in which the pixel value becomes less than 0 when the image of FIG. 9B is extracted from an image obtained by blurring the image of FIG. 9B by the predetermined filter, the value will be clipped to 0.

Figure 12A:
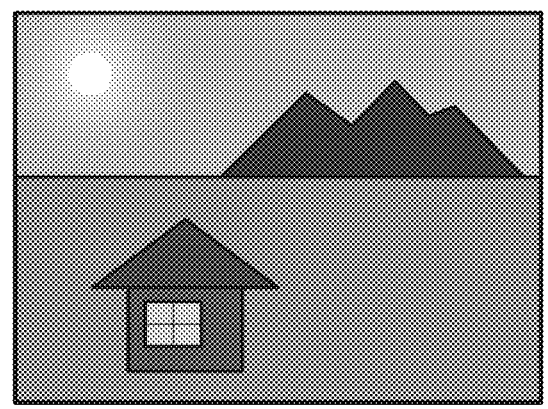
FIG. 12A is a view showing an execution example of artifact correction performed by an artifact correction execution unit according to the first embodiment.
Figure 12B:
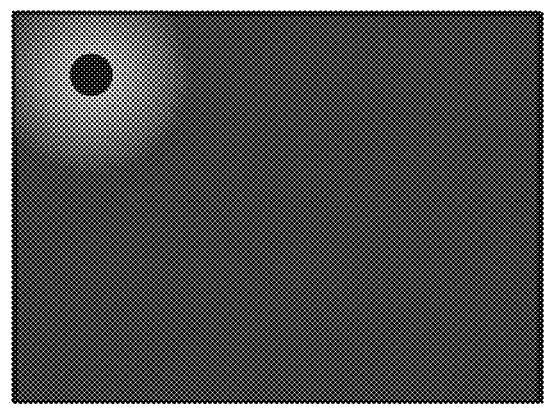
FIG. 12B is a view showing an execution example of artifact correction performed by the artifact correction execution unit according to the first embodiment.

An example of artifact correction executed by the artifact correction execution unit 206 will be described next with reference to FIGS. 12A to 12C. FIG. 12A shows an image obtained by the image obtainment unit 101 and corresponds to FIG. 9A. FIG. 12B shows a corrected artifact component image that has been obtained by applying the correction amount calculated by the correction amount calculation unit 203 to the image generated by artifact detection unit 205 and indicates the artifact component of FIG. 10B.

For example, in a case in which the maximum luminance value of the display device of the image display unit 103 is 500 nits, a correction amount α is determined to be 14.6% based on the correction table of FIG. 7B. Letting A be an image indicating the artifact component of the FIG. 10A, a corrected artifact component image Ac is obtained by $$Ac=(1-\alpha)\times A$$

Figure 12C:
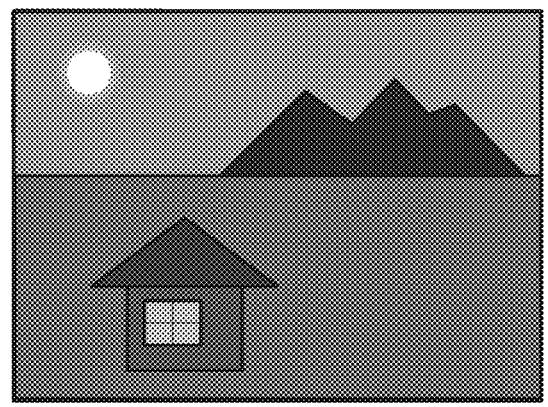
FIG. 12C is a view showing an execution example of artifact correction performed by the artifact correction execution unit according to the first embodiment.

FIG. 12C shows an image obtained as a result of subtracting the corrected artifact component image of FIG. 12B from the image of FIG. 12A as the artifact correction processing. In this case as well, if the pixel value becomes less than 0 at the execution of the subtraction processing, the value will be clipped to 0. As shown in FIG. 12B, a different amount of correction is performed depending on the position on the image based on the position and the color of the high-luminance component in the input image.

Each pixel of the image shown in FIG. 12A includes RGB components, and each pixel of the corrected artifact component image of FIG. 12B includes only one luminance component. Hence, the artifact correction execution unit obtains a corrected luminance value Y' by converting the image of FIG. 12A into that of a YUV color space once and subtracting the luminance component of the FIG. 12B from the luminance Y component. Subsequently, the artifact correction execution unit reconverts the image based on Y', U, and V values back into a RGB color space image, and outputs the reconverted image to the image display unit 103. Note that the final reconversion is not needed in a case in which the image display unit 103 can display a YUV-format image.

Note that although an example in which a digital gain is applied to the artifact component of FIG. 10A based on the correction amount calculated by the correction amount calculation unit 203 was described above, the control amount can be also controlled by generating a plurality of artifact component images by using a plurality of filters of different sizes and coefficients in the blurring process of the high-luminance region by the artifact detection unit 205 and making a selection based on the correction amount calculated by the correction amount calculation unit 203.

Note that the correction processing may be executed by transmitting only average pixel value and the position of the high-luminance region extracted by the artifact detection unit 205 to the artifact correction execution unit 206 and generating the artifact component by the artifact correction execution unit.

Correction processing executed by using a Laplacian filter as an artifact correction method which is different from the above-described correction processing will be described next. FIGS. 13A and 13B show Laplacian filters that have different degrees of intensity. FIG. 13A shows an example of a Laplacian filter having a relatively low intensity, and FIG. 13B shows an example of a Laplacian filter having a relatively high intensity. Although only two filters are shown as examples in the respective drawings, it is preferable to store even more filters in the artifact correction execution unit 206 so as to be able to cover each correction amount calculated by the correction amount calculation unit 203. Based on the correction amount calculated by the correction amount calculation unit 203, the artifact correction execution unit 206 will control the correction amount by performing filter processing in which an increasingly high intensity filter is used in accordance with the increase in the correction amount.

Figure 14A:
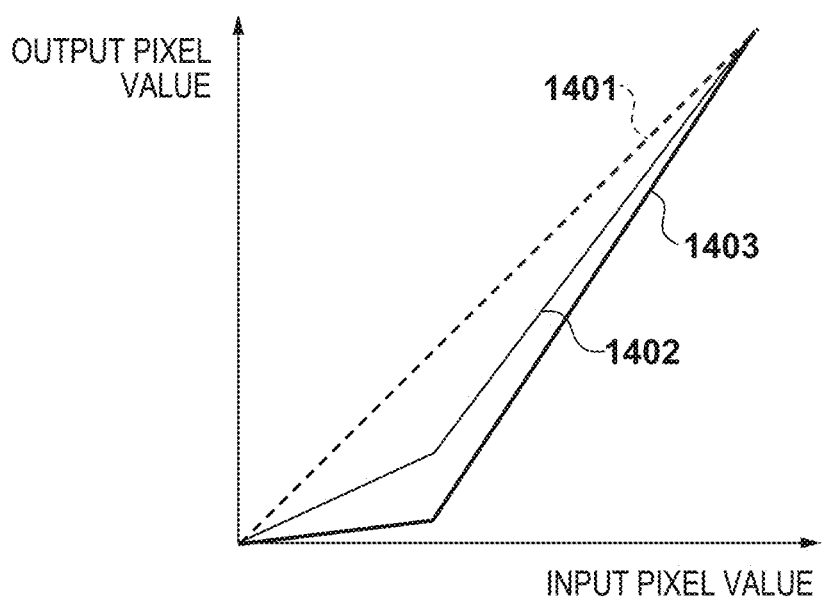
FIG. 14A is a graph for explaining a correction method performed by executing tone conversion processing by the artifact correction execution unit according to the first embodiment.

In addition, correction processing executed by tone conversion as an artifact correction method which is different from the two correction methods described above will be described. FIG. 14A is a gamma characteristic graph showing the relationship between an output pixel value and an input pixel value. Reference numeral 1401 shown in FIG. 14A indicates a state without conversion in which the input pixel value and the output pixel value are equal, and reference numerals 1402 and 1403 show gamma characteristics that reduce the output pixel value particularly in a dark (low pixel value) region. Although only two characteristics are exemplified in FIG. 14A, it is preferable to store even more gamma characteristics in the artifact correction execution unit 206 so as to be able to cover each correction amount calculated by the correction amount calculation unit 203. However, in a coordinate space in which the input pixel value is indicated by the abscissa and the output value is indicated by the ordinate, each gamma characteristic is a conversion characteristic that passes a region below the boundary where the input value and the output value are equal to each other.

Figure 14B:
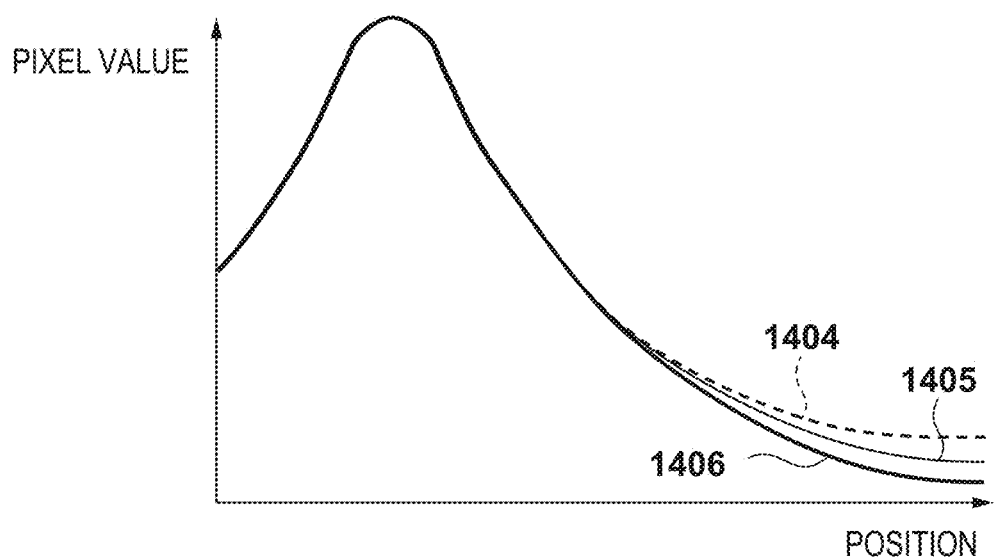
FIG. 14B is a graph for explaining the correction method performed by executing the tone conversion processing by the artifact correction execution unit according to the first embodiment.

Based on the correction value calculated by the correction amount calculation unit 203, the artifact correction execution unit 206 controls correction amount by executing tone conversion processing by selecting a gamma characteristic that reduces the pixel value the larger the correction amount is. That is, the gamma characteristic 1402 indicates the gamma characteristic of a case in which the correction amount is relatively small, and the gamma characteristic 1403 indicates the gamma characteristic of a case in which the correction amount is relatively large. FIG. 14B is a graph showing the relationship between the pixel value and a position on the line that passes the center of the sun which is the high-luminance region of FIG. 9A. Reference numeral 1404 indicates a pixel value obtained when correction is not performed. Reference numeral 1405 indicates a pixel value obtained by executing conversion by the gamma characteristic 1402, and reference numeral 1406 indicates a pixel value obtained by executing conversion by the gamma characteristic 1403. It can be seen that compared to the pixel value curve 1405, more corrections have been executed in the pixel value curve 1406 obtained by applying the gamma characteristic 1403 when a large correction amount is calculated by the correction amount calculation unit 203.

Note that the correction processing described above may be executed on RGB values or on YUV values after the conversion.

As described above, according to this embodiment, it is possible to execute correction so that an artifact component related to the luminance or a color originating from a high-luminance region of an image will become smaller the higher the luminance value of the image displayed on an image display device is. As a result, a sense of incongruity given to an observer and originating from an artifact when the observer observes a display device capable of performing high-luminance display can be suppressed.

Second Embodiment

The above first embodiment described an image processing apparatus and a method that correct an artifact such as a flare when an image displayed on a display device is high. The second embodiment will describe a method to purposely add an artifact such as a flare to express brightness or glare when an image is to be displayed on an image display device which has a comparatively low luminance value. Since the basic arrangement and the image processing procedures of the image processing apparatus are similar to those of the first embodiment, this embodiment will describe only the differences from the first embodiment.

Artifact Correction Amount Calculation

Figures 15A, 15B:
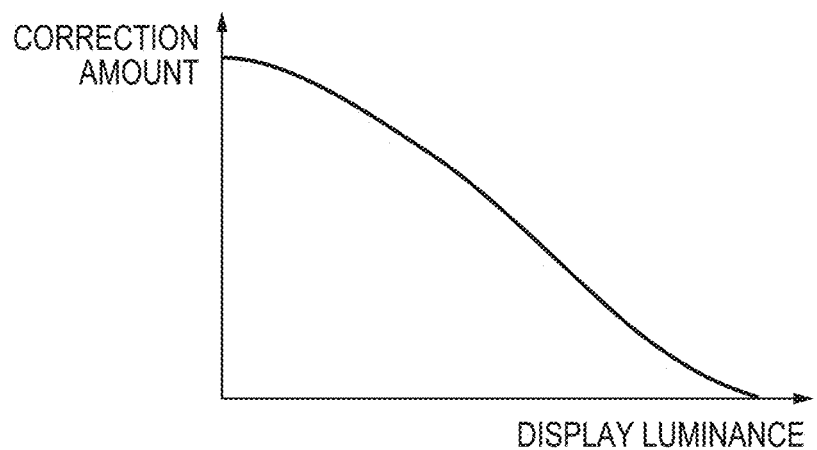
FIG. 15A is graph showing the contents of a correction table according to the second embodiment.
FIG. 15B is a table showing the contents of the correction table according to the second embodiment.

FIG. 15A shows correction curve indicated by a correction table 202, and FIG. 15B is the specific lookup table (LUT). The graph of FIG. 15A shows the relationship between the correction amount and the display luminance value obtained by a display luminance obtainment unit 104. It can be seen that the lower the value of the display luminance information, the larger correction amount is. In addition, FIG. 15B is an LUT describing the relationship shown in FIG. 15A. The correction table 202 is stored in an LUT format as shown in FIG. 15B. In a case in which the display luminance value obtained by the display luminance obtainment unit 104 is a value between two display luminance values described in the LUT, the correction amount corresponding to the display luminance value closest to that obtained by the display luminance obtainment unit is referred to. Alternatively, the correction amount may be obtained by executing interpolation by a known interpolation technique such as linear interpolation. Note that other than the LUT format shown in FIG. 15B, the relationship between the display luminance value and the correction amount may be held as a function.

In addition, in a similar manner to the first embodiment, correction may be executed based on an environmental light intensity obtained by an environmental light obtainment unit 204, and it is preferable for the correction table 202 to hold an LUT for each of the plurality of environmental light intensities.

Artifact Correction Processing

A method of detecting an artifact by an artifact detection unit 205 and a method of adding an artifact by an artifact correction execution unit 206 according to the second embodiment will be described with reference to FIGS. 16A to 16E.

Figure 16A:
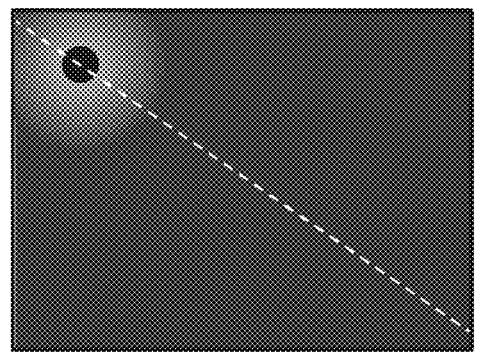
FIG. 16A is a view for explaining an artifact detection method and an artifact addition method according to the second embodiment.
Figure 16B:
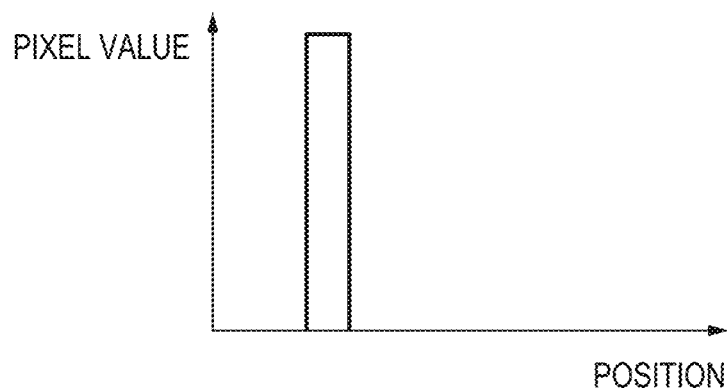
FIG. 16B is a graph for explaining the artifact detection method and the artifact addition method according to the second embodiment.
Figure 16C:
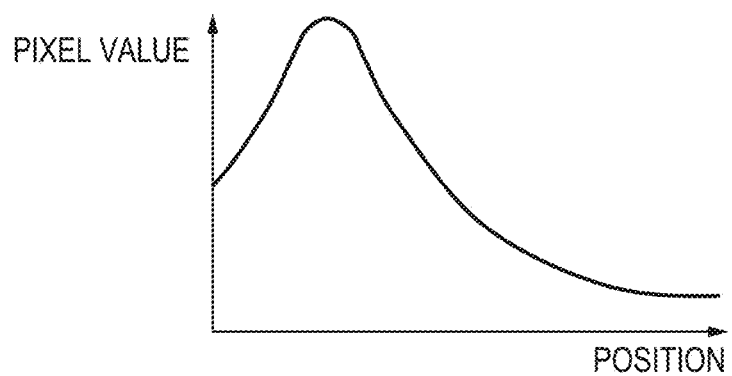
FIG. 16C is a graph for explaining the artifact detection method and the artifact addition method according to the second embodiment.

FIG. 16A shows an artifact component detected from the image of FIG. 9A, in a similar manner to FIG. 10A. FIG. 16B is a graph showing the relationship between a pixel value and a position of the image corresponding to that of FIG. 9A, in a similar manner to FIG. 10B. FIG. 16C is a graph showing the relationship between a pixel value and a position of an image obtained by blurring the image of FIG. 9B by a predetermined filter in a similar manner to FIG. 10C. The dotted line in each of FIGS. 16D and 16E is a graph showing the relationship between a pixel value and a position of an image obtained by subtracting the image of FIG. 9B from the image obtained by blurring the image of FIG. 9B) by the predetermined filter, and each dotted line shows an artifact component of FIG. 9A. Each solid line of FIGS. 16D and 16E indicates a reference value of an artifact component which is added by the artifact correction execution unit 206. The solid line of FIG. 16D indicates a pixel value obtained by applying a digital gain based on the correction amount on a pixel value indicated by the dotted line. The digital gain of FIG. 16D is a gain having a characteristic that increases the pixel value the farther the distance is from the high-luminance region, and the luminance value to be added is in accordance with the correction amount. In a similar manner to FIG. 16D, FIG. 16E shows a pixel value obtained by applying a digital gain based on the correction amount on a pixel value indicated by the dotted line. The digital gain of FIG. 16E is a gain having a characteristic that increases the pixel value the closer the distance is from the high-luminance region, and the luminance value to be added is in accordance with the correction amount. Note that the image obtained by applying the gain is clipped at the maximum pixel value of the high-luminance region. Either the solid line of FIG. 16D or the solid line of FIG. 16E may be used to execute correction by the artifact correction execution unit 206. Note that this selection will be made by the user.

Figure 17A:
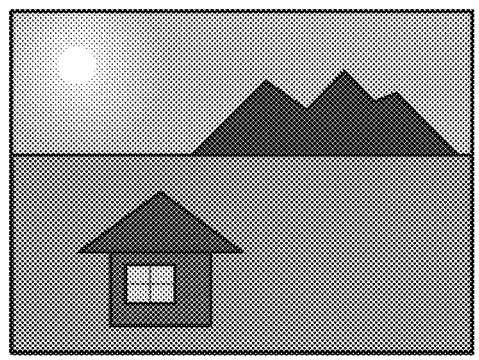
FIG. 17A is a view showing an execution example of artifact correction by an artifact correction execution unit according to the second embodiment.
Figure 17B:
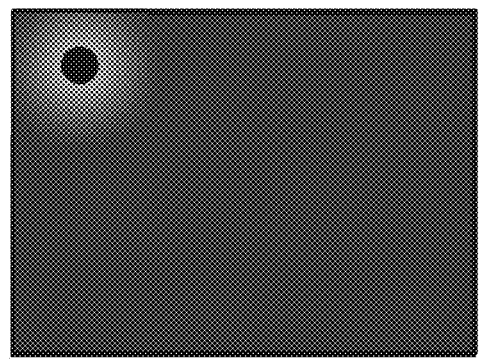
FIG. 17B is a view showing the execution example of artifact correction by the artifact correction execution unit according to the second embodiment.
Figure 17C:
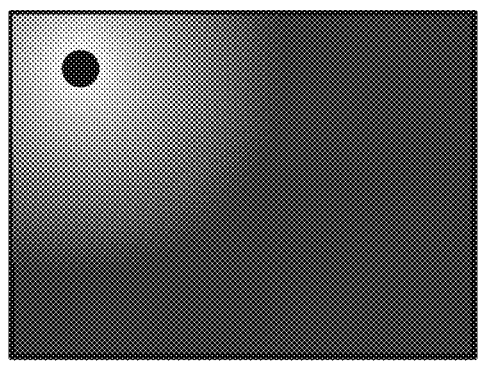
FIG. 17C is a view showing the execution example of artifact correction by the artifact correction execution unit according to the second embodiment.
Figure 17D:
FIG. 17D is a view showing the execution example of artifact correction by the artifact correction execution unit according to the second embodiment.

FIGS. 17A to 17D are views showing execution examples of the artifact correction by the artifact correction execution unit 206 according to the second embodiment. FIG. 17A shows an image obtained by the image obtainment unit 101 and corresponds to FIG. 9A, and FIG. 17B shows an artifact component detected by the artifact detection unit 205 and corresponds to FIG. 16A. FIG. 17C shows an artifact component to be added. This artifact component is an image obtained by applying a digital gain to the reference value of the artifact component to be added indicated by the solid line of FIG. 16D or FIG. 16E based on the correction amount calculated by a correction amount calculation unit 203. In the correction processing according to the second embodiment, first, the artifact correction execution unit 206 subtracts (removes) the artifact component shown in FIG. 17B from the original image shown in FIG. 17A. If the pixel value obtained after the subtraction is less than 0, the value is clipped to 0. Next, the artifact correction execution unit 206 adds the artifact component of FIG. 17C to the image obtained after the subtraction. FIG. 17D shows an image obtained as a result of this processing, and it can be seen that the artifact component has increased.

Figure 18A:
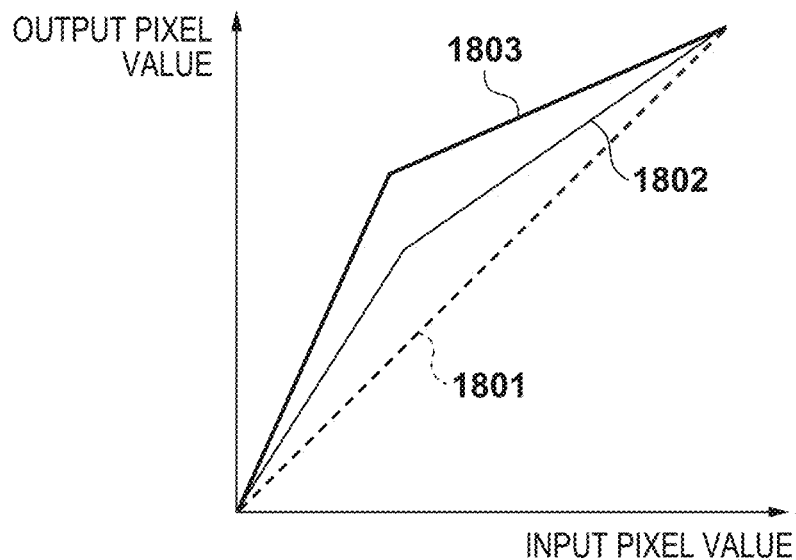
FIG. 18A is a graph for explaining a correction method performed by executing tone conversion processing by the artifact correction execution unit according to the second embodiment.
Figure 18B:
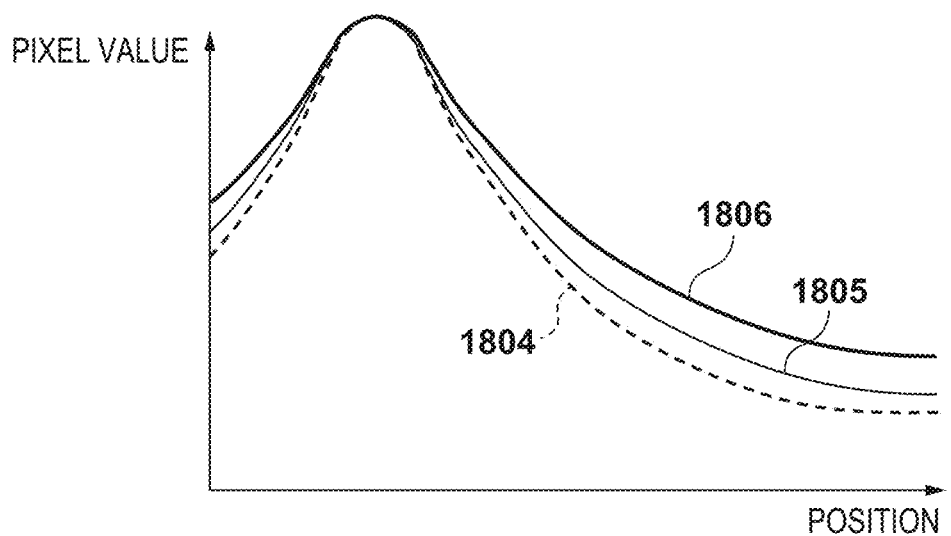
FIG. 18B is a graph for explaining the correction method performed by executing tone conversion processing by the artifact correction execution unit according to the second embodiment.

Furthermore, correction processing by tone conversion will be described as another artifact correction method. FIG. 18A is a gamma characteristic graph showing the relationship between an input pixel value and an output pixel value. In contrast to reference numeral 1801 indicating a state in which tone conversion is not performed, reference numerals 1802 and 1803 denote gamma characteristics that increase the output pixel value. The artifact correction execution unit 206 controls the correction amount by executing tone conversion processing by selecting a gamma characteristic which increases the pixel value the larger the correction value is based on the correction value calculated by the correction amount calculation unit 203. That is, reference numeral 1802 indicates the gamma characteristic of a case in which the correction amount is relatively small, and reference numeral 1803 indicates the gamma characteristic of a case in which the correction amount is relatively large. FIG. 18B is a graph showing the relationship between a pixel value and a position on a line that passes through the center of the sun which is the high-luminance region of FIG. 9A. Reference numeral 1804 denotes a pixel value curve obtained when correction is not performed. Reference numeral 1805 denotes a pixel value curve obtained by performing conversion by the gamma characteristic 1802, and reference numeral 1806 denotes a pixel value curve obtained by performing conversion by the gamma characteristic 1803. It can be seen that more corrections are performed in the curve 1806 to which the gamma characteristic 1803 of a case in which the correction amount calculated by the correction amount calculation unit 203 is relatively large has been applied than in the curve 1805. Note that a greater number of gamma characteristics may be prepared to increase options. In this case, in a coordinate space in which the abscissa indicates the input pixel value and the ordinate indicates the output value, each gamma characteristic is a characteristic that has a conversion characteristic which passes a region above the boundary where the input value and the output value are equal to each other.

As described above, according to the second embodiment, it is possible to execute correction so that the lower the luminance value of the image is, the artifact component related to the luminance or a color originating from a high-luminance region of an image displayed by the image display device will be increased. As a result, it becomes possible to express brightness or glare as if the actual scene is being observed by an observer when he/she observes a display device which has a low display luminance value.

Third Embodiment

The first embodiment and the second embodiment described an image processing apparatus and a method for correcting an artifact related to the luminance or a color originating from a high-luminance region of an image displayed on an image display device based on the luminance of the image. This embodiment will describe a method in which a correction amount is adjusted by a user and a method in which an image is selected by the user.

Figure 19:
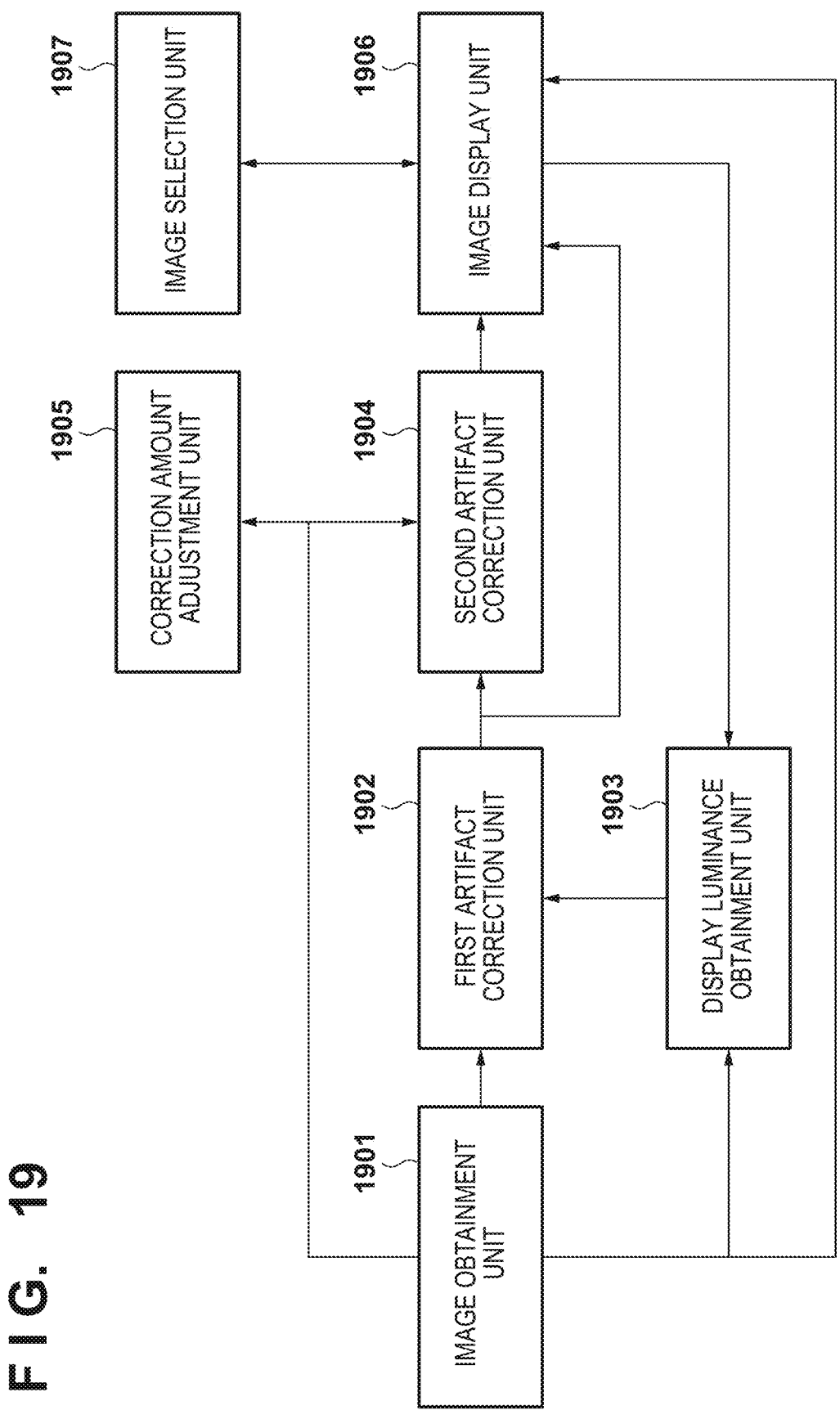
FIG. 19 is a schematic block diagram of an image processing apparatus according to the third embodiment.

FIG. 19 is a schematic block diagram showing the schematic arrangement of an image processing apparatus according to the third embodiment. An image obtainment unit 1901 obtains a display-target image. The generation source of the image to be obtained is not particularly limited. A first artifact correction unit 1902 performs processing, which is similar to the artifact correction processing described in the first embodiment, on the image obtained by the image obtainment unit 1901 based on display luminance information obtained by a display luminance obtainment unit 1903 (to be described later). The display luminance obtainment unit 1903 obtains display luminance information to be used for artifact correction executed by the first artifact correction unit 1902. A second artifact correction unit 1904 performs artifact correction on an image obtained by the image obtainment unit 1901 or an image that has undergone the correction processing executed by the first artifact correction unit 1902 based on the correction amount adjusted by the user by a correction amount adjustment unit 1905 (to be described later). The correction amount adjustment unit 1905 includes a user interface (UI) for the user to adjust the correction amount of an artifact and determine the correction amount to be used by the second artifact correction unit 1904. An image display unit 1906 includes an image display device. Subsequently, the correction amount adjustment unit 1905 displays the image obtained by image obtainment unit 1901, the image whose artifact has been automatically corrected based on the display luminance by the first artifact correction unit 1902, and an image whose artifact has been corrected by the second artifact correction unit 1904 based on user adjustment so that the displayed images can be compared. Instead of displaying all of these images simultaneously, the image display unit 1906 may simultaneously display two images out of these images or may display each image by switching the image one by one. An image selection unit 1907 includes a UI for the user to select an image by using the image display of the image display unit 1906.

Figure 20:
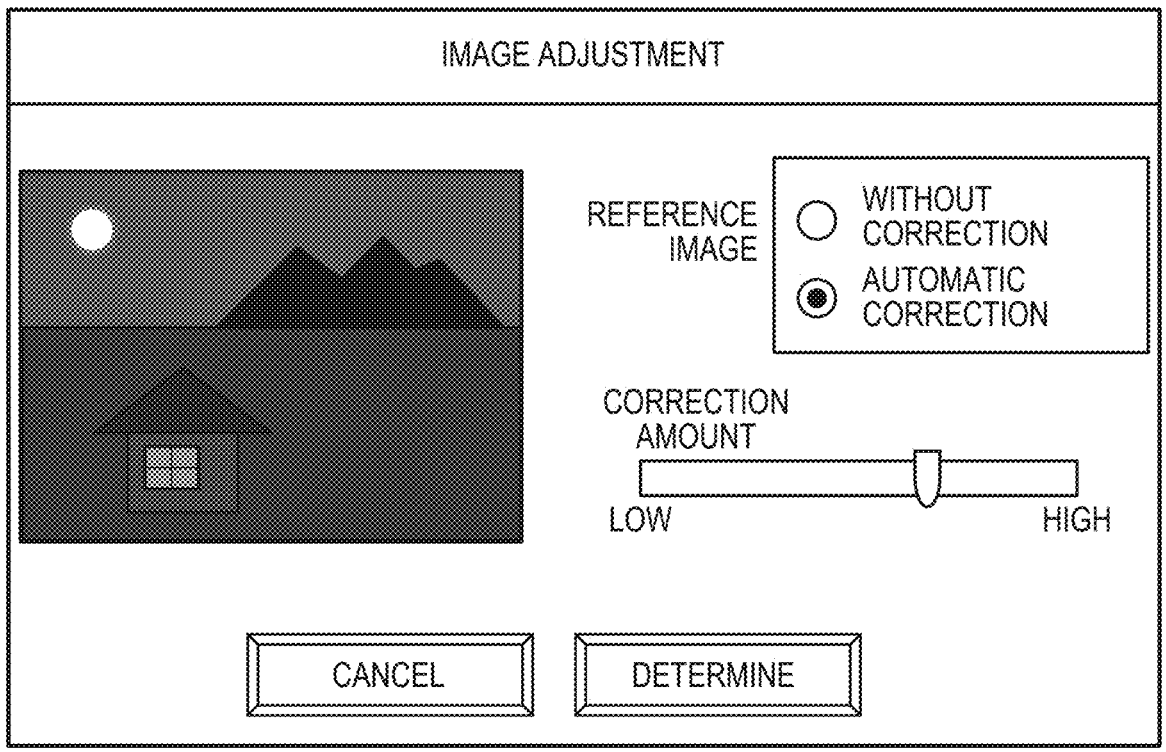
FIG. 20 is a view showing an example of a user interface related to the correction amount in a correction amount adjustment unit according to the third embodiment.

FIG. 20 is a UI (user interface) included in the correction amount adjustment unit 1905 for the user to adjust the correction amount to be used in artifact correction. It is preferable for this UI to include toggle buttons for making a selection between two options so that an image to be used as a correction reference can be selected between an image obtained by the image obtainment unit 1901 and an image which has undergone the correction processing by the first artifact correction unit 1902. Radio buttons "without correction" and "automatic correction" illustrated in FIG. 20 exemplify this selection made between two options. The image to be used as a reference need not always be selected from these images, and the reference image may be either one of these images. Furthermore, this UI has a function of displaying an image that has been corrected based on the correction amount adjusted by the user. The user can determine the correction amount by confirming this correction result. FIG. 20 shows how the user can use a slider to designate the intensity of the correction amount.

FIG. 21 is a UI included in the image selection unit 1907 for the user to select an image. This UI includes toggle buttons that allow an image to be selected among the image obtained by the image obtainment unit 1901, the image that has undergone correction processing by the first artifact correction unit 1902, and the image that has undergone correction by the second artifact correction unit 1904 based on an adjustment instruction from the user. Selection-target images need not be all of these images, and it may be arranged so that only two of these images will be displayed.

Figure 22A:
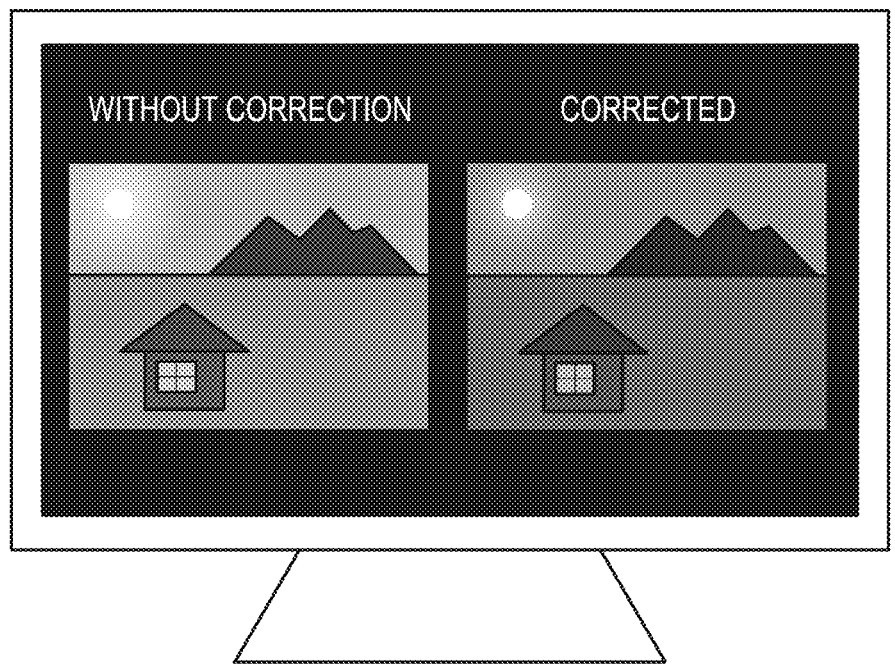
FIG. 22A is a view showing an example of image comparison display performed in an image display unit according to the third embodiment.
Figure 22B:
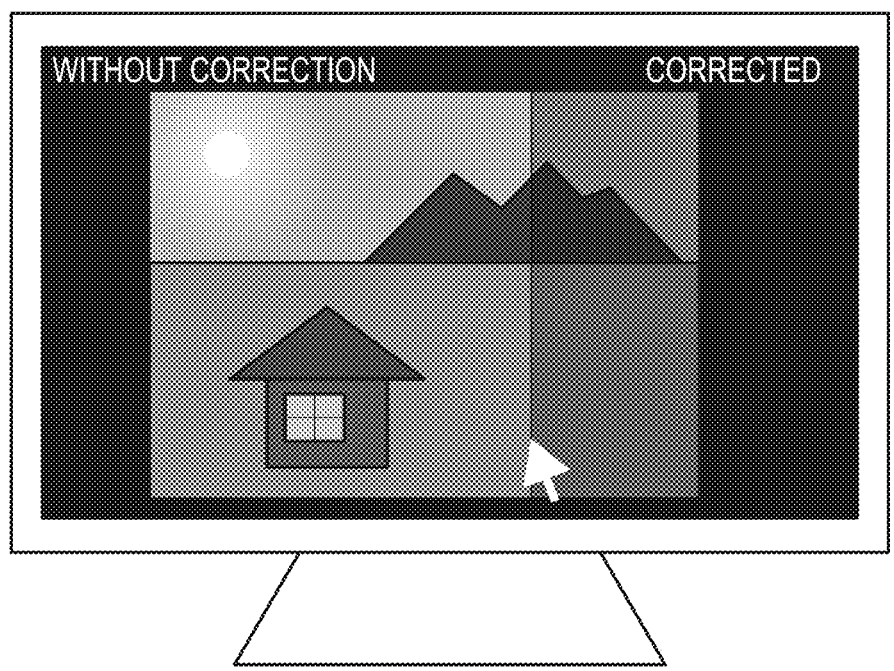
FIG. 22B is a view showing an example of image comparison display performed in the image display unit according to the third embodiment.

FIGS. 22A and 22B show examples of image display by the image display unit 1906. FIG. 22A shows a method of arranging and displaying comparison-target images, and FIG. 22B shows an example of displaying different images on the right side and on the left side of a divided region. In FIG. 22B, it is preferable for the boundary position to be able to be moved laterally by using a mouse cursor as shown in FIG. 22B, a keyboard (not shown), or the like. The display position shown in FIG. 22A and the division direction shown in FIG. 22B are not limited to these. Also, as the image to be displayed, it may be arranged so that the image obtained by the image obtainment unit 1901, the image that has undergone the correction processing by the first artifact correction unit 1902, and the image corrected by the second artifact correction unit 1904 based on the correction amount adjusted by the user will be displayed simultaneously.

As described above, according to the third embodiment, it is possible for the user to adjust the correction amount of an artifact related to the luminance or the color originating from a high-luminance region of an image due to a difference in the luminance of a display device.

According to the present invention, it is possible to correct, with consideration to the luminance of a display device, an image artifact related to the luminance or a color that originates from a high-luminance region set as the display target. As a result, it is possible to suppress a sense of incongruity caused by the artifact when a display device capable of high-luminance display is observed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that corrects image data to be displayed on a display device, the image data representing an image which includes (a) a first region and (b) a second region surrounding the first region, the apparatus comprising:
    a processor; and
    a memory storing instructions which, when executed by the processor, causes the image processing apparatus to function as a plurality of units comprising:
    (1) an obtainment unit configured to obtain information corresponding to a luminance range which can be displayed by the display device;
    (2) a derivation unit configured to derive a correction amount for correcting an artifact of the image data based on (a) the information obtained by the obtainment unit and (b) the image data, wherein the correction amount for the first region is smaller than the correction amount for the second region, and wherein the correction amount for the second region is reduced as the second region falls outside the first region in the image; and
    (3) a correction unit configured to correct the image data based on the derived correction amount and to generate display image data.

2. The apparatus according to claim 1, wherein the correction unit includes:
    a binarization unit configured to binarize the display-target image data by using a preset luminance threshold, and to generate a binary image in which a high-luminance region and a non-high-luminance region are discriminated;
    a calculation unit configured to calculate an average luminance value of the high-luminance region; and
    a generation unit configured to generate a first image in which a pixel of the high-luminance region has the average luminance value and a luminance value of a pixel of the non-high-luminance region is assumed to be zero, to generate a second image in which a luminance value is reduced as the pixel falls outside the high-luminance region by executing preset blurring filter processing on the first image, to generate third image data by subtracting the luminance value of the second image from the first image, and to generate image data for performing correction related to an artifact component by correcting the third image based on the correction amount derived by the derivation unit,
    wherein the display image data is generated by subtracting the image data generated by the generation unit from the display-target image data.

3. The apparatus according to claim 1, wherein the correction unit includes:
    a binarization unit configured to binarize the display-target image data by using a preset luminance threshold to generate a binary image in which a high-luminance region and a non-high-luminance region are discriminated;
    a calculation unit configured to calculate an average luminance value of the high-luminance region; and
    a generation unit configured to generate a first image in which a pixel of the high-luminance region has the average luminance value and a luminance value of a pixel of the non-high-luminance region is assumed to be zero, to generate a plurality of second images in each of which a luminance value is reduced as the pixel falls outside the high-luminance region by executing blurring filter processing operations having different characteristics from each other on the first image, to select one of the plurality of second images based on the correction amount derived by the derivation unit, and to generate image data for performing correction related to an artifact component by subtracting the luminance value of the selected second image from the first image,
    wherein the display image data is generated by subtracting the image data generated by the generation unit from the display-target image data.

4. The apparatus according to claim 1, wherein the correction unit includes:
    a plurality of conversion units which are preset and have different gamma characteristics from each other; and
    a selection unit configured to select one of the plurality of conversion units based on the correction amount derived by the derivation unit,
    wherein the display image data is generated by converting the display-target image data by using the selected conversion unit.

5. The apparatus according to claim 4, wherein, in a coordinate space in which an abscissa indicates an input pixel value and an ordinate indicates an output pixel value, each of the plurality of conversion units has a conversion characteristic passing below a boundary where the input pixel value and the output pixel value are equal to each other.

6. The apparatus according to claim 4, wherein, in a coordinate space in which an abscissa indicates an input pixel value and an ordinate indicates an output pixel value, each of the plurality of conversion units has a conversion characteristic passing above a boundary where the input pixel value and the output pixel value are equal to each other.

7. The apparatus according to claim 1, wherein the correction unit includes:
    a binarization unit configured to binarize the display-target image data by using a preset luminance threshold to generate a binary image in which a high-luminance region and a non-high-luminance region are discriminated;
    a calculation unit configured to calculate an average luminance value of the high-luminance region;
    a first generation unit configured to generate a first image in which a pixel of the high-luminance region has the average luminance value and a luminance value of a pixel of the non-high-luminance region is assumed to be zero, to generate a second image in which a luminance value is reduced as the pixel falls outside the high-luminance region by executing preset blurring filter processing on the first image, to generate third image data by subtracting the luminance value of the second image from the first image, and to correct the third image based on the correction amount derived by the derivation unit to generate fourth image data for removing an artifact; and a second generation unit configured to generate, with respect to the third image, image data for correction that expresses an artifact component based on the correction amount derived by the derivation unit, wherein the display image data is generated by adding the image data generated by the second generation unit to the image data obtained by subtracting the fourth image data from the display-target image data.

8. The apparatus according to claim 7, wherein the second generation unit generates one of (a) image data in which a luminance value to be added is increased the farther a distance is from the high-luminance region and (b) image data in which the luminance value to be added increases the closer the distance is from the high-luminance region.

9. The apparatus according to claim 1, wherein the plurality of units further comprises a display control unit configured to display on the display device (a) an image indicated by the display image data obtained by the correction unit and (b) a user interface which adjusts the correction amount in accordance with an operation by a user.

10. The apparatus according to claim 1, wherein the obtainment unit further obtains information related to environmental light intensity of the surroundings of the display device, and wherein the derivation unit derives the correction amount based on the environmental light intensity and the maximum luminance value of the display device.

11. A control method of an image processing apparatus that corrects image data to be displayed on a display device, the image data representing an image which includes (a) a first region and (b) a second region surrounding the first region, the method comprising:

obtaining information corresponding to a luminance range that can be displayed by the display device;

deriving a correction amount for correcting an artifact of the image data based on (a) the information obtained in the obtaining and (b) the image data, wherein the correction amount for the first region is smaller than the correction amount for the second region, and wherein the correction amount for the second region is reduced as the second region falls outside the first region in the image; and correcting the image data based on the derived correction amount and generate display image data.

12. The method according to claim 11, wherein the correcting includes:

(a) binarizing the display-target image data by using a preset luminance threshold and generating a binary image in which a high-luminance region and a non-high-luminance region are discriminated;

(b) calculating an average luminance value of the high-luminance region; and (c) generating a first image in which a pixel of the high-luminance region has the average luminance value and a luminance value of a pixel of the non-high-luminance region is assumed to be zero, generating a second image in which a luminance value is reduced as the pixel falls outside the high-luminance region by executing preset blurring filter processing on the first image, generating third image data by subtracting the luminance value of the second image from the first image, and generating image data for performing correction related to an artifact component by correcting the third image based on the correction amount derived in the derivation, wherein the display image data is generated by subtracting the image data generated in the generating (c) from the display-target image data.

13. The method according to claim 11, wherein the correcting includes:

(a) binarizing the display-target image data by using a preset luminance threshold, and generating a binary image in which a high-luminance region and a non-high-luminance region are discriminated;

(b) calculating an average luminance value of the high-luminance region; and (c) generating a first image in which a pixel of the high-luminance region has the average luminance value and a luminance value of a pixel of the non-high-luminance region is assumed to be zero, generating a plurality of second images in each of which a luminance value is reduced as the pixel falls outside the high-luminance region by executing blurring filter processing operations having different characteristics from each other on the first image, selecting one of the plurality of the second images based on the correction amount derived by the deriving, and generating image data for performing correction related to an artifact component by subtracting the luminance value of the selected second image from the first image, wherein the display image data is generated by subtracting the image data generated in the generating (c) from the display-target image data.

14. The method according to claim 11, wherein the correcting includes:

selecting one of a plurality of conversion steps based on the correction amount derived in the deriving, wherein the plurality of conversion steps are preset and use different gamma characteristics from each other, wherein the display image data is generated by converting the display-target image data by using the selected conversion step.

15. The method according to claim 14, wherein, in a coordinate space in which an abscissa indicates an input pixel value and an ordinate indicates an output pixel value, each of the plurality of conversion steps has a conversion characteristic passing below a boundary where the input pixel value and the output pixel value are equal to each other.

16. The method according to claim 14, wherein, in a coordinate space in which an abscissa indicates an input pixel value and an ordinate indicates an output pixel value, each of the plurality of conversion steps has a conversion characteristic passing above a boundary where the input pixel value and the output pixel value are equal to each other.

17. The method according to claim 11, wherein the correcting includes:

(a) binarizing the display-target image data by using a preset luminance threshold to generate a binary image in which a high-luminance region and a non-high-luminance region are discriminated;

(b) calculating an average luminance value of the high-luminance region;

(c) generating a first image in which a pixel of the high-luminance region has the average luminance value and a luminance value of a pixel of the non-high-luminance region is assumed to be zero, generating a second image in which a luminance value is reduced as the pixel falls outside the high-luminance region by executing preset blurring filter processing on the first image, generating third image data by subtracting the luminance value of the second image from the first image, and correcting the third image based on the correction amount derived by the deriving to generate fourth image data for removing an artifact; and (d) generating, with respect to the third image, image data for correction that expresses an artifact component based on the correction amount derived in the deriving, wherein the display image data is generated by adding the image data generated in the generating (d) to the image data obtained by subtracting the fourth image data from the display-target image data.

18. The method according to claim 17, wherein, in the generating (d), there is generated one of (1) image data in which a luminance value to be added is increased the farther a distance is from the high-luminance region and (2) image data in which the luminance value to be added is increased the closer the distance is from the high-luminance region.

19. The method according to claim 11, further comprising:
   displaying, on the display device, (a) an image indicated by the display image data obtained in the correcting and (b) a user interface which adjusts the correction amount in accordance with an operation by a user.

20. A non-transitory computer-readable storage medium storing a program which, when read and executed by a computer, causes the computer to execute the steps of a control method of an image processing apparatus that corrects image data to be displayed on a display device, the image data representing an image which includes (a) a first region and (b) a second region surrounding the first region, the method comprising:
   obtaining information corresponding to a luminance range that can be displayed by the display device;
   deriving a correction amount for correcting an artifact of the image data based on (a) the information obtained in the obtaining and (b) the image data, wherein the correction amount for the first region is smaller than the correction amount for the second region, and wherein the correction amount for the second region is reduced as the second region falls outside the first region in the image; and
   correcting the image data based on the derived correction amount and generate display image data.

* * * * *